Figure 1:
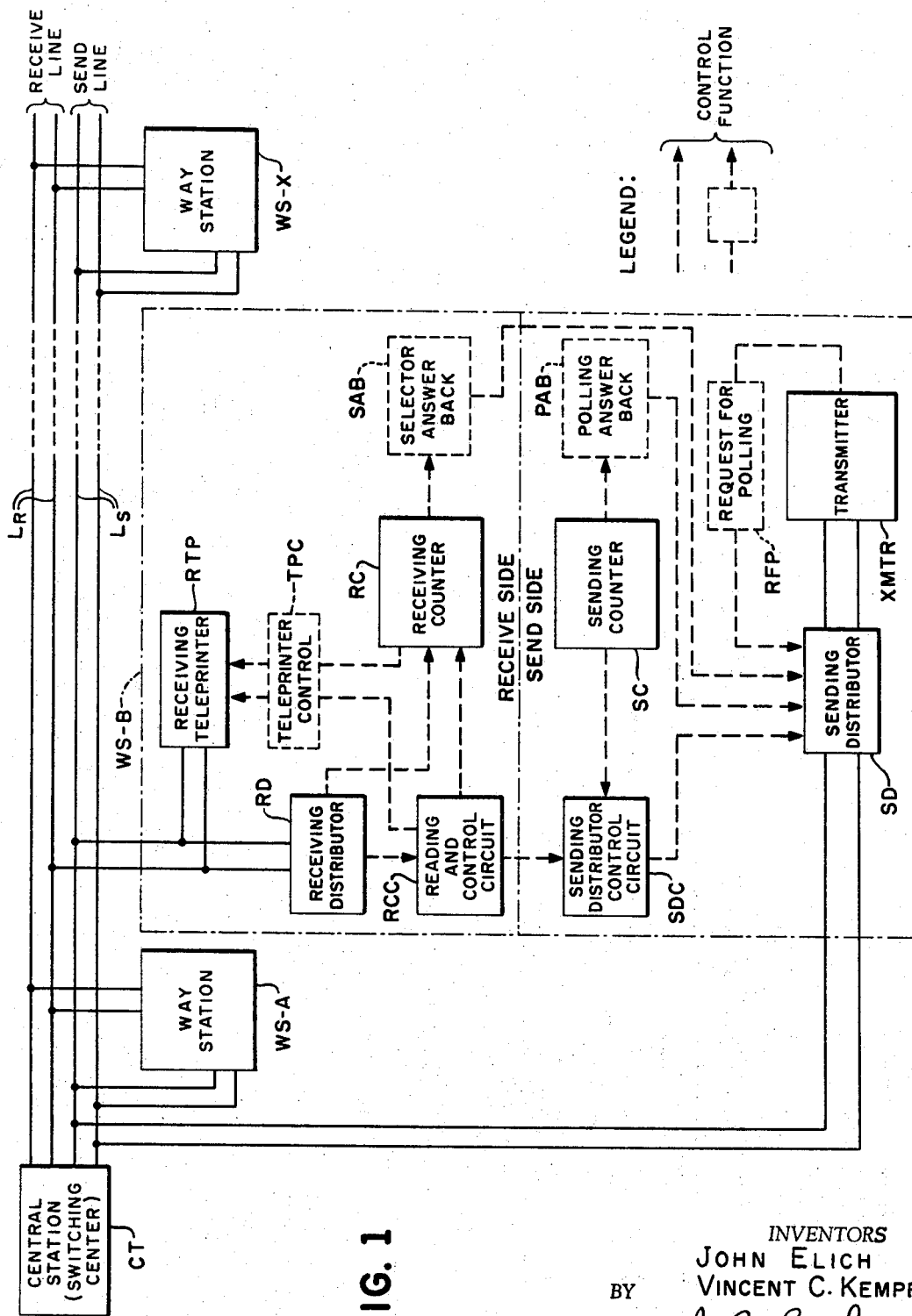

INVENTORS
JOHN ELICH
VINCENT C. KEMPF
BY J. B. Burke
ATTORNEY

March 19, 1968 J. ELICH ET AL 3,374,309
DUPLEX WAY STATION SELECTOR
Filed March 30, 1964 20 Sheets-Sheet 2

INVENTORS
JOHN ELICH
VINCENT C. KEMPF
BY
J. B. Burke
ATTORNEY

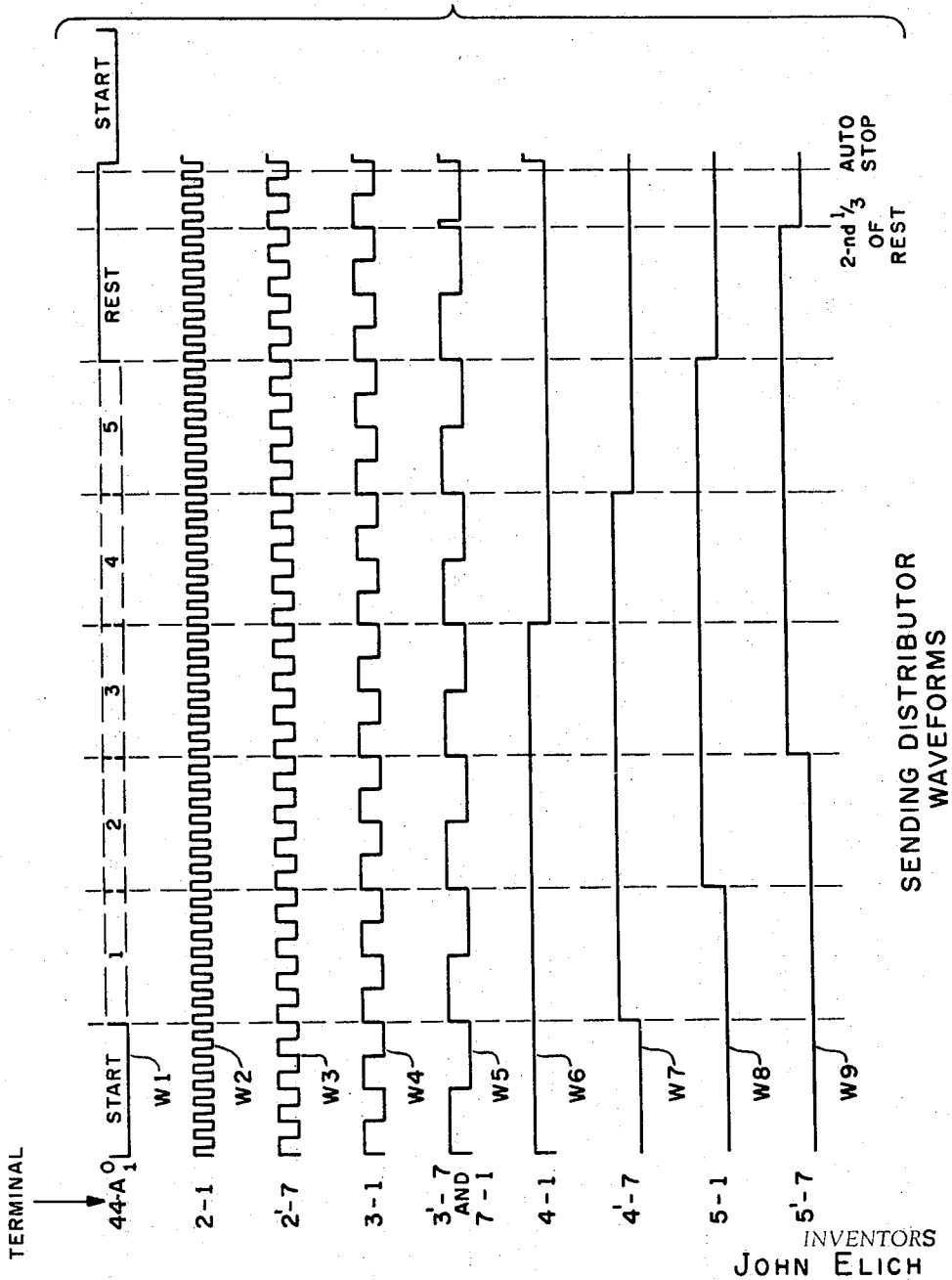

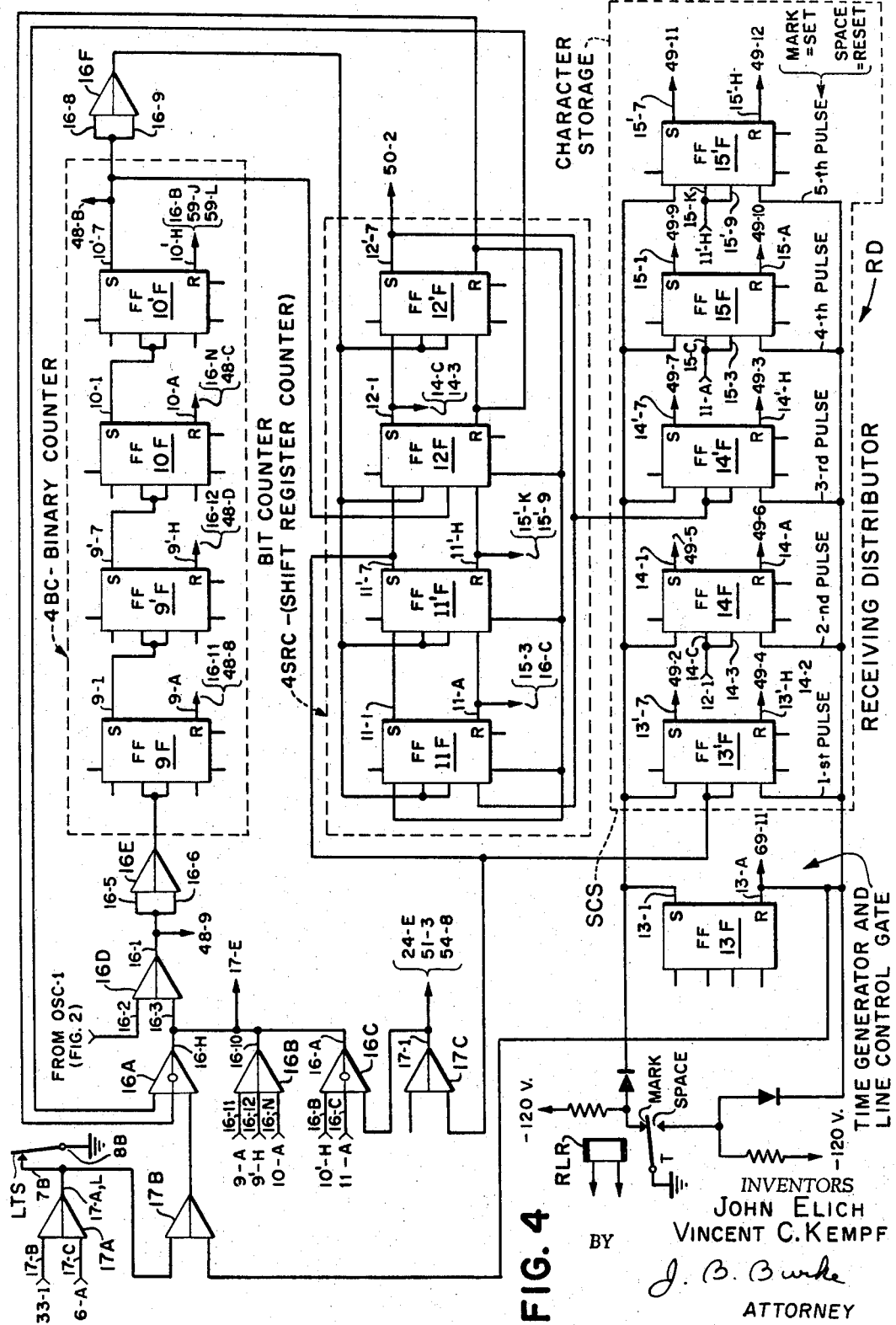

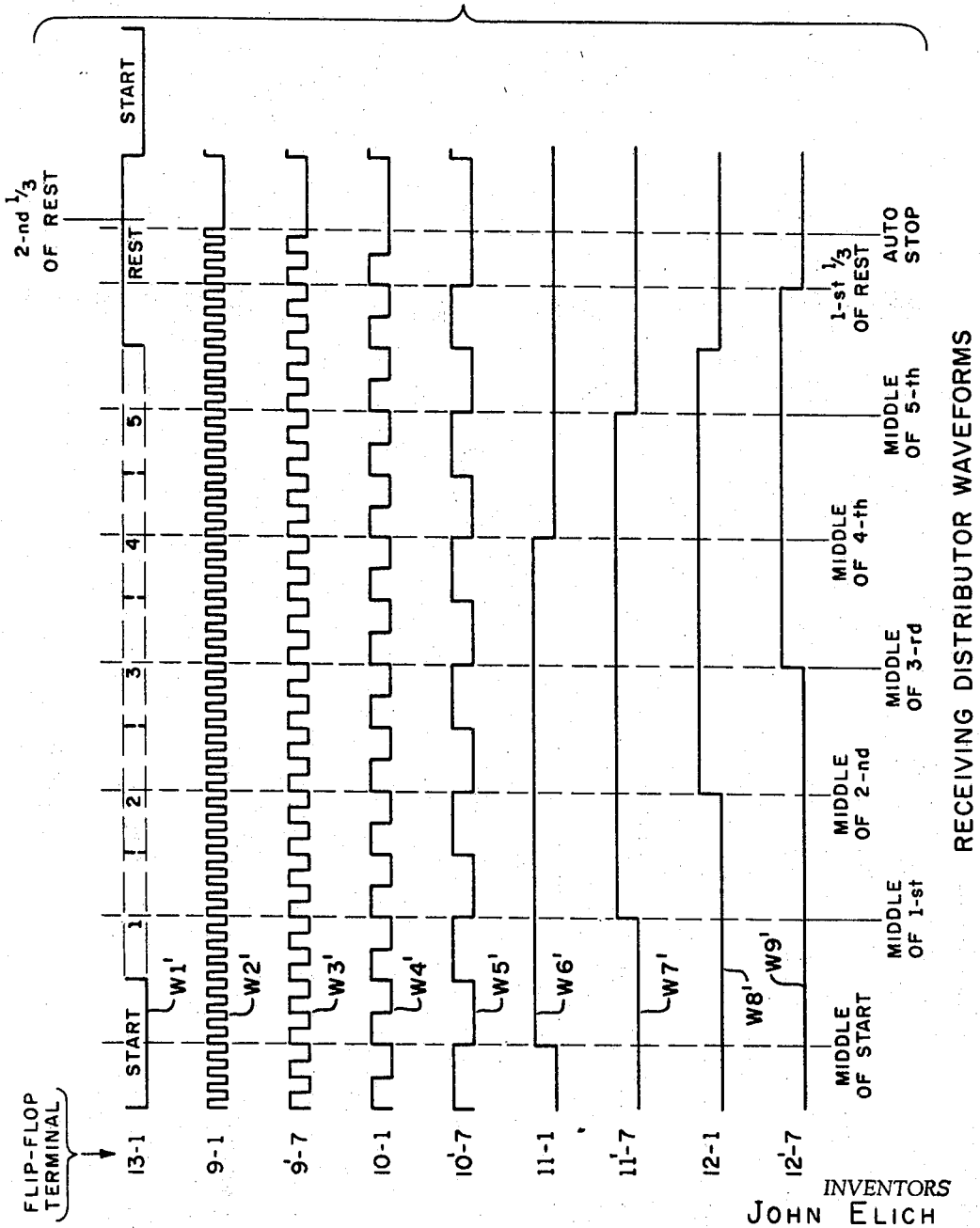

INVENTORS
JOHN ELICH
VINCENT C. KEMPF
BY J. B. Burke
ATTORNEY

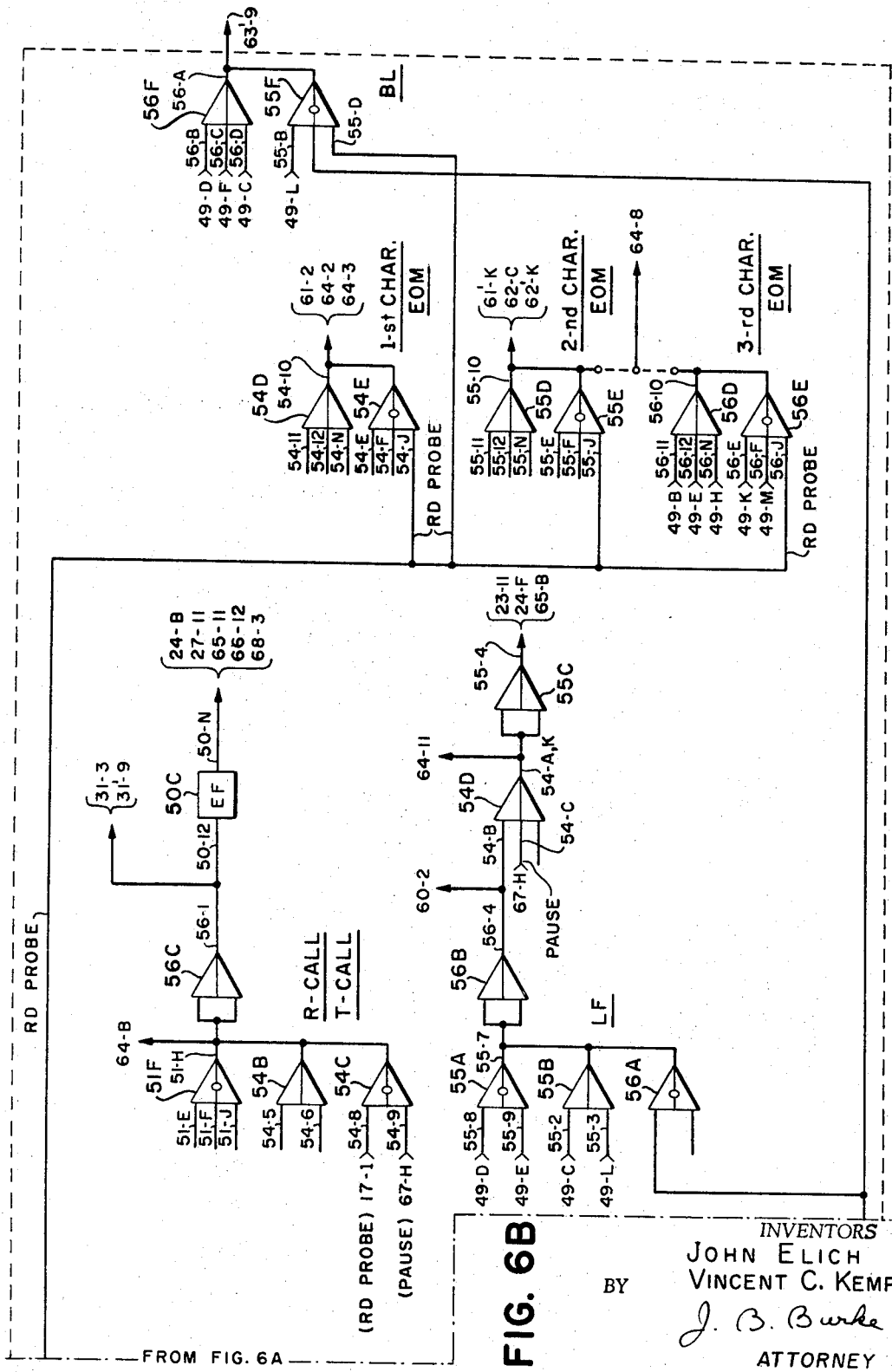

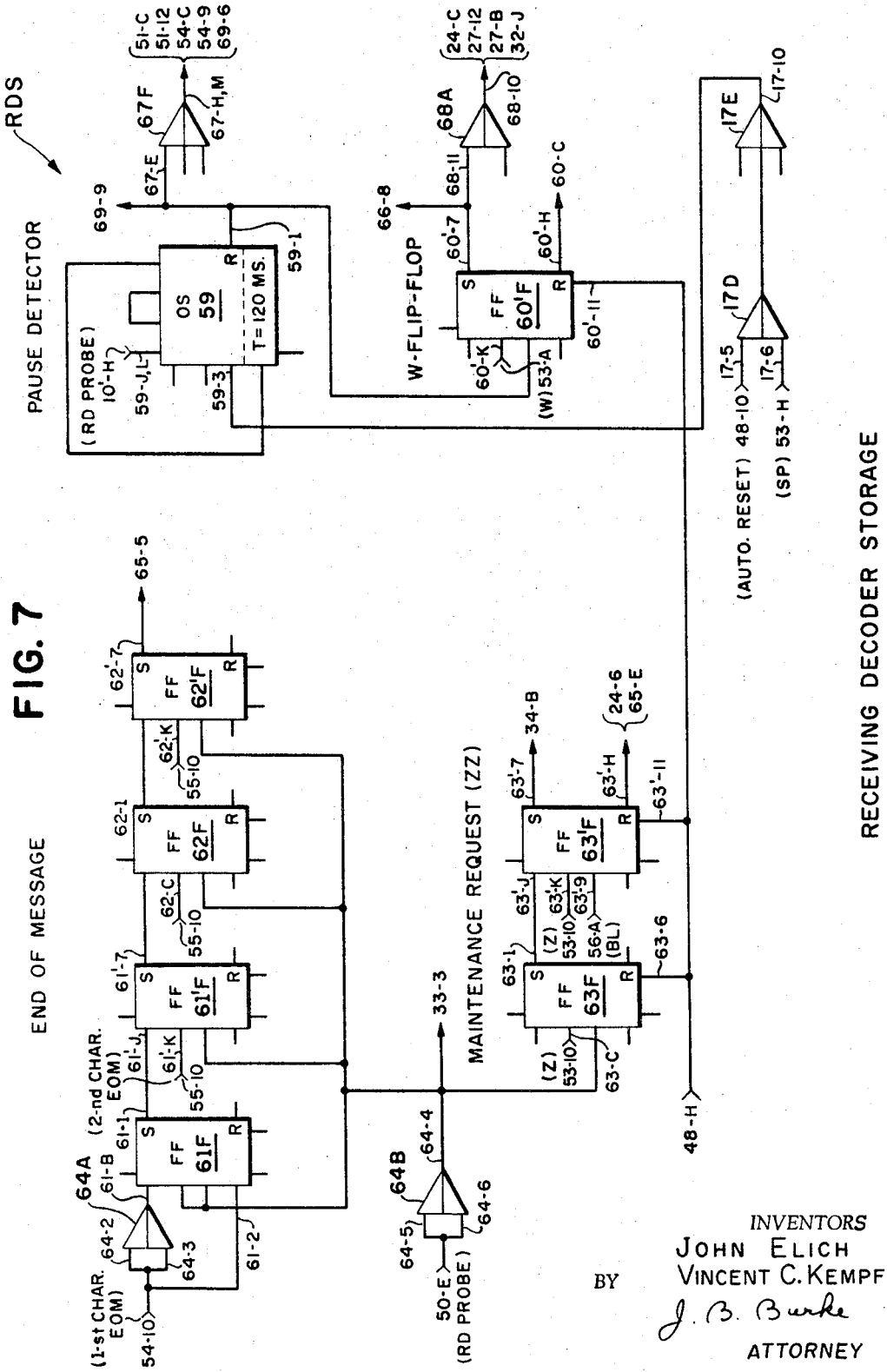

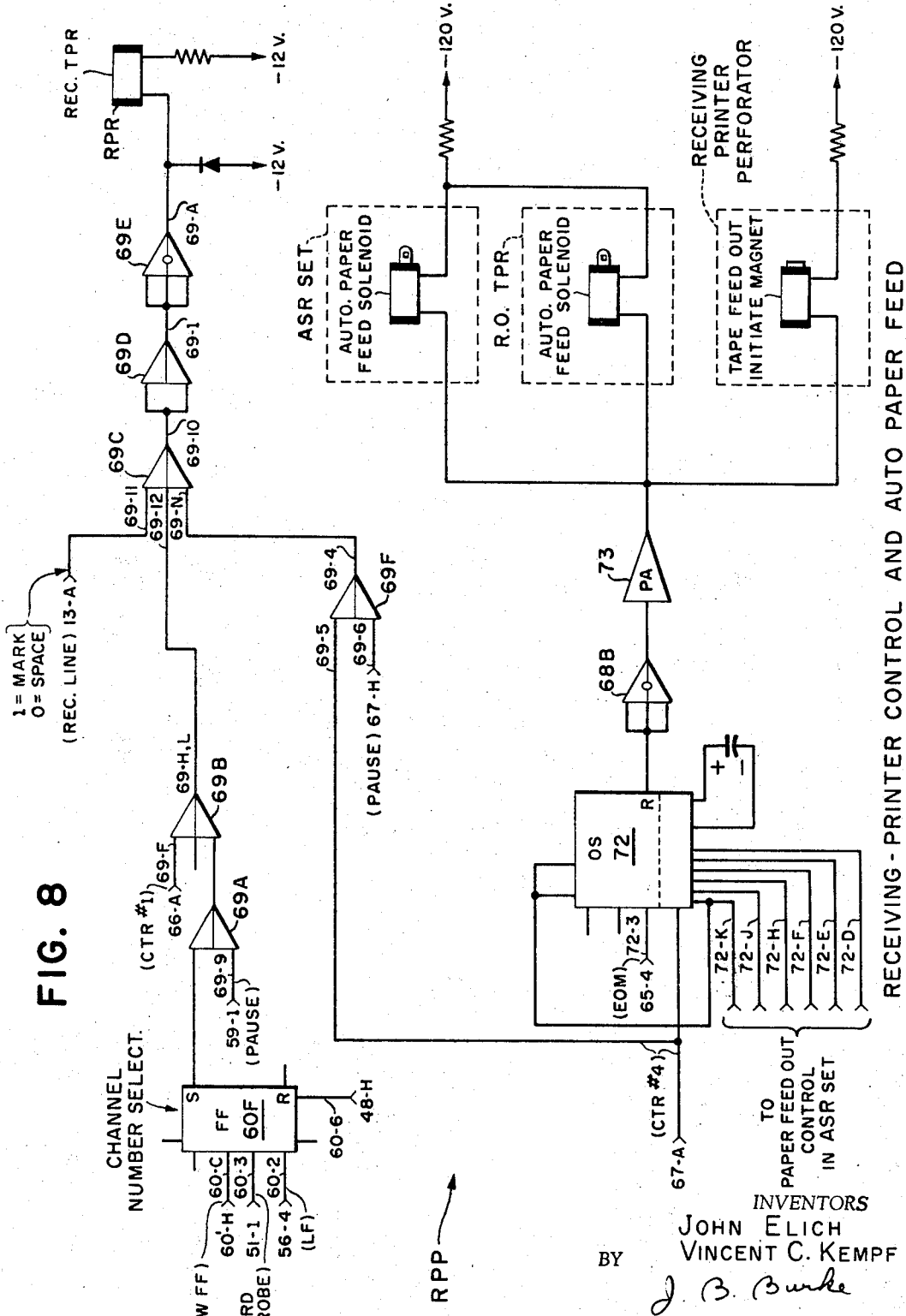

March 19, 1968 J. ELICH ETAL 3,374,309
DUPLEX WAY STATION SELECTOR
Filed March 30, 1964 20 Sheets-Sheet 13

FIG. 12

SENDING — SD CONTROL, XTR. CONTROL AND CENTER CLOSE OUT DETECTOR

INVENTORS
JOHN ELICH
VINCENT C. KEMPF
BY
J. B. Burke
ATTORNEY

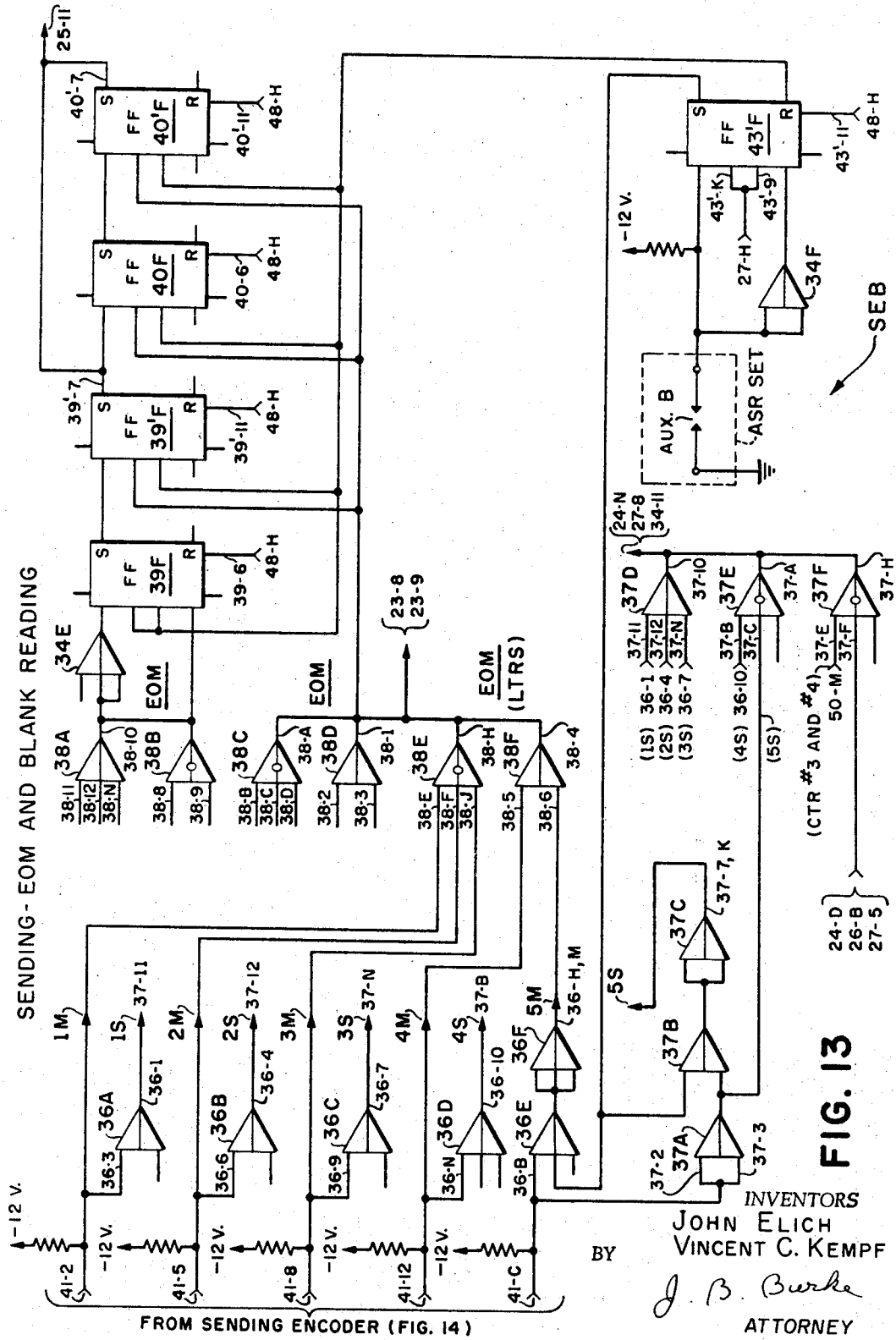

March 19, 1968     J. ELICH ETAL     3,374,309
DUPLEX WAY STATION SELECTOR
Filed March 30, 1964     20 Sheets-Sheet 15
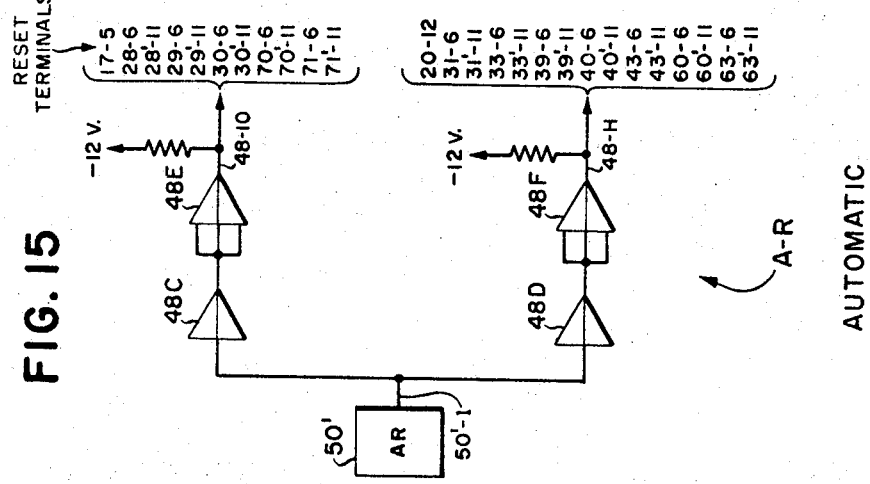
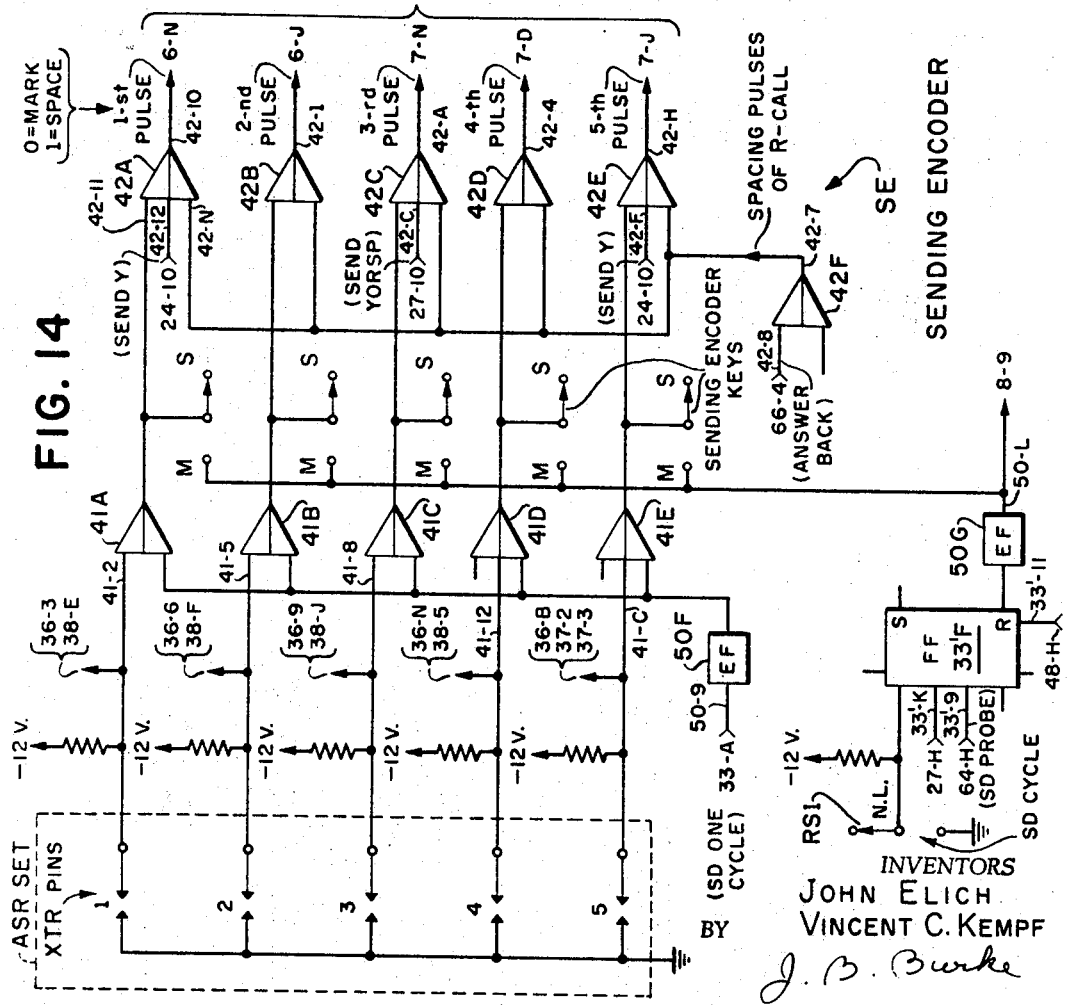
INVENTORS
JOHN ELICH
VINCENT C. KEMPF
BY J. B. Burke
ATTORNEY

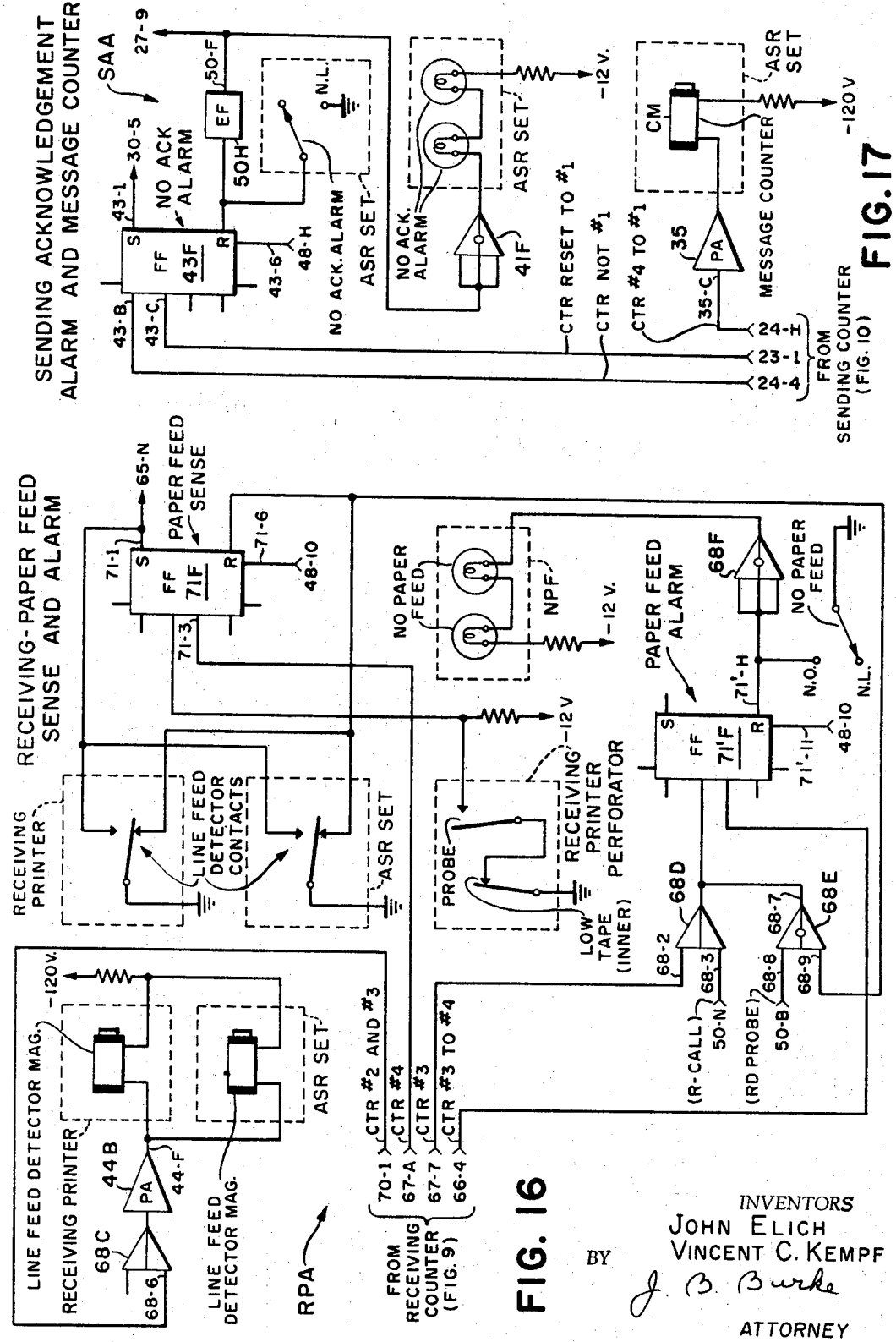

SWITCHING SYSTEM

March 19, 1968 J. ELICH ET AL 3,374,309
DUPLEX WAY STATION SELECTOR
Filed March 30, 1964 20 Sheets-Sheet 18
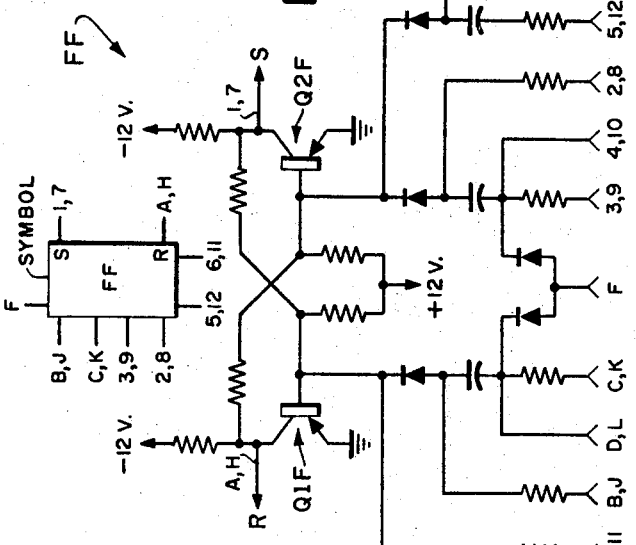
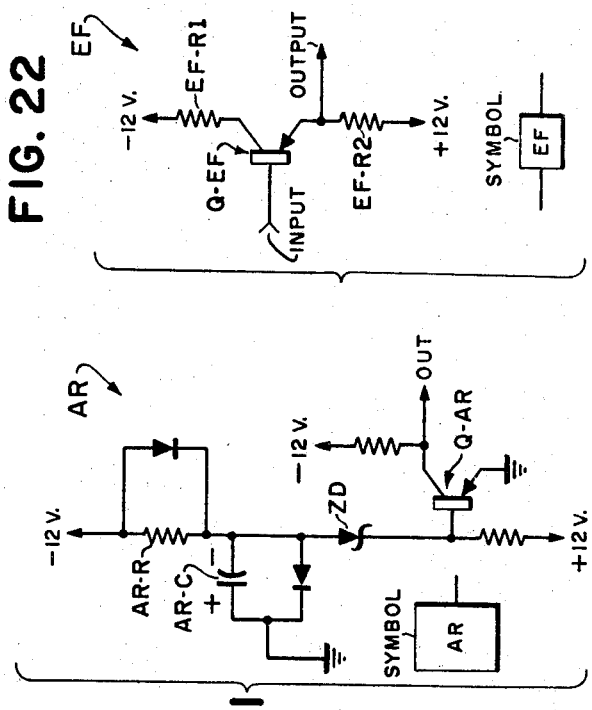
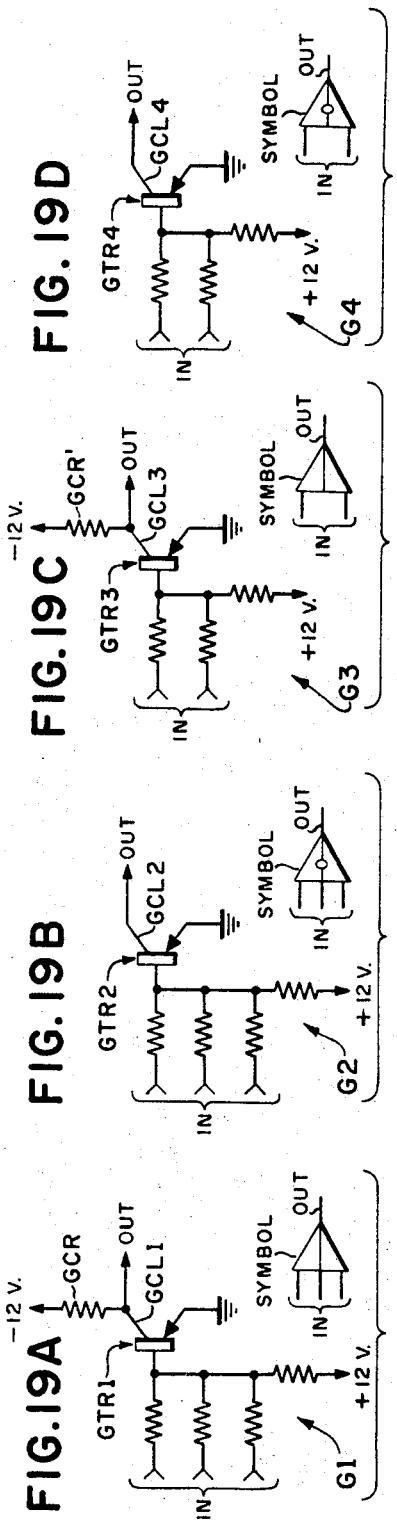
INVENTORS
JOHN ELICH
VINCENT C. KEMPF
BY J. B. Burke
ATTORNEY

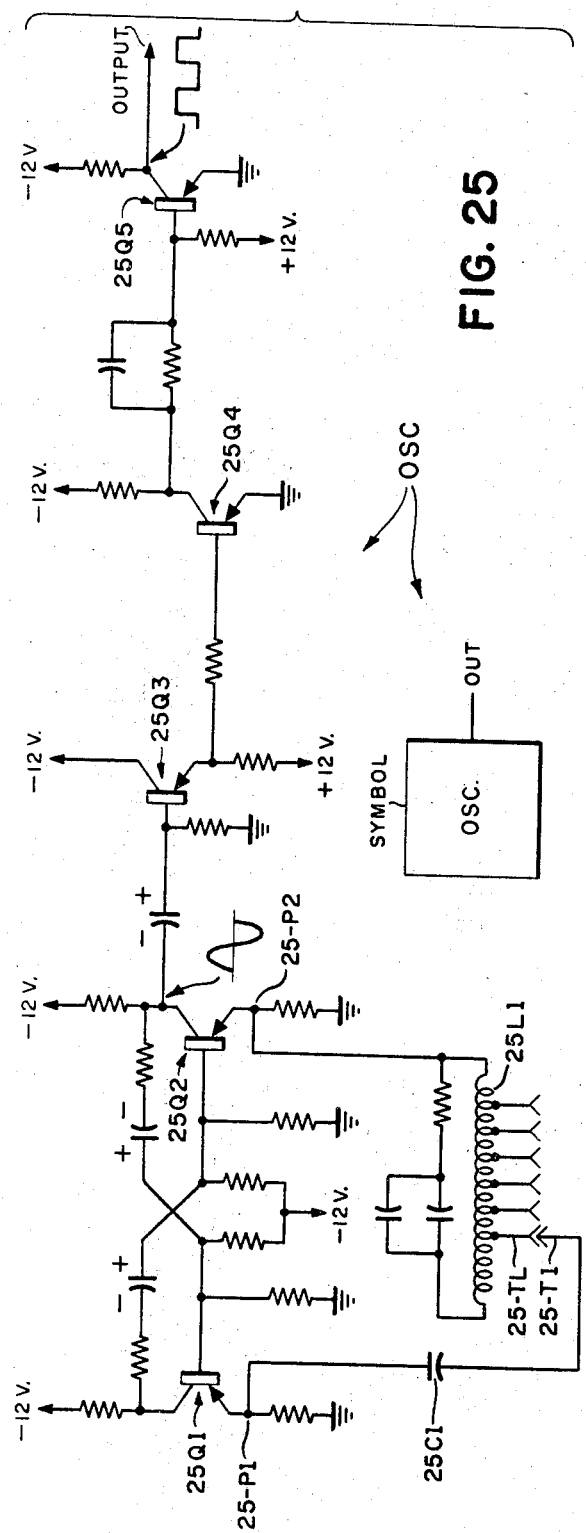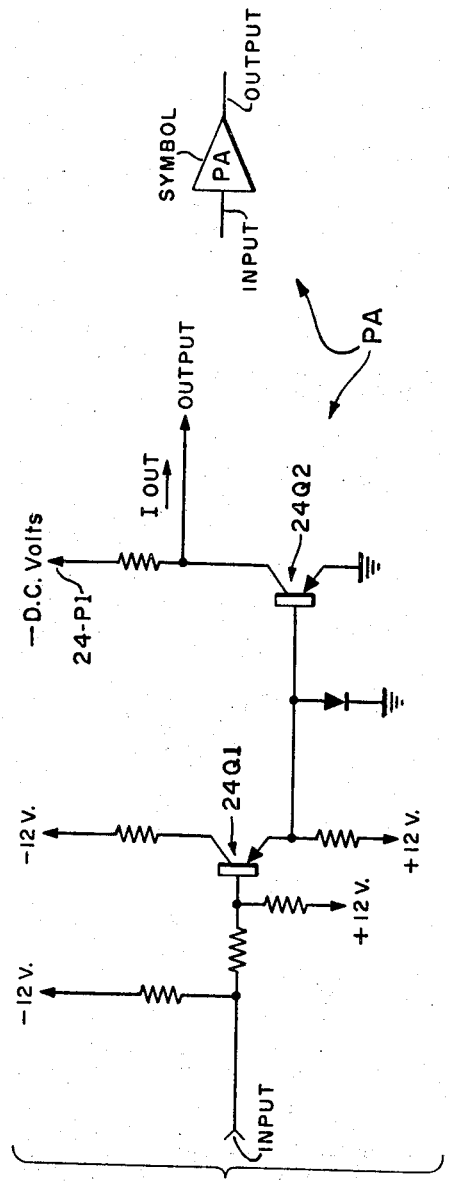

United States Patent Office 3,374,309
Patented Mar. 19, 1968

3,374,309
DUPLEX WAY STATION SELECTOR
John Elich, Staten Island, and Vincent C. Kempf, South Ozone Park, N.Y., assignors to The Western Union Telegraph Company, New York, N.Y., a corporation of New York
Filed Mar. 30, 1964, Ser. No. 355,541
15 Claims. (Cl. 178—2)

This invention relates to a way station selector for a telegraph system, and more particularly concerns a versatile, solid state duplex way station selector for use in a multi-station telegraph system, wherein a central station may select any one of a plurality of way stations for signal transmission thereto or invite any one of the way stations to transmit signals to the central station, and wherein signal reception by any selected way station and transmission from the selected way station may occur simultaneously.

One object of the invention is to provide a duplex way station selector having receive and send sides, each of which includes a counter and associated control circuitry for programming operation of the respective receive and send sides of the selector.

Another object is to provide a way station selector employing modular transistorized units to facilitate assembly, simplify servicing and reduce cost of manufacture.

A further object is to provide in the receive side of a duplex way station selector, a counter including two flip-flops capable of four distinctive counts, and associated gates which permit reading and testing various conditions in addition to controlling a message printer.

Another object is to provide a duplex way selector in which the receive side thereof is programmed by a counter to insure the following:
(1) The blinding of a printer until a proper preamble and call are received.
(2) Presence of adequate paper in the receive printer.
(3) Transmission of an answer-back signal to the central station.
(4) Reset of various reading gates to initial conditions.
(5) Blinding the printer during additional station selection steps.
(6) Reading End-of-Message transmission.

A further object is to provide in the sending side of a duplex way station selector a counter including two flip-flops capable of four distinctive counts, and associated gates which control starting and stopping of a sending distributor and which in addition exercise and generate function responses.

Another object is to provide a duplex way selector in which the sending side of the way selector is programmed by a counter to insure the following:
(1) The idling of blanks through the transmitter.
(2) The transmission of an invitation request by a sending distributor.
(3) A transmission of "yes" and "no" responses to polling invitation.
(4) Sounding alarm if receive response from the central station is missing.
(5) Sending of message transmission via a sending distributor.
(6) Interrupting the sending distributor if an answer-back is required.
(7) Setting an alarm timer for receipt of End-of-Message response delay.
(8) Deleting signals from message waiting indicator.

A still further object is to provide a duplex transistorized way station selector capable of a greater variety and range of functions, responses and indications, and involving more sophisticated types of controls than have heretofore been available in prior way station selector systems.

Figure 2:
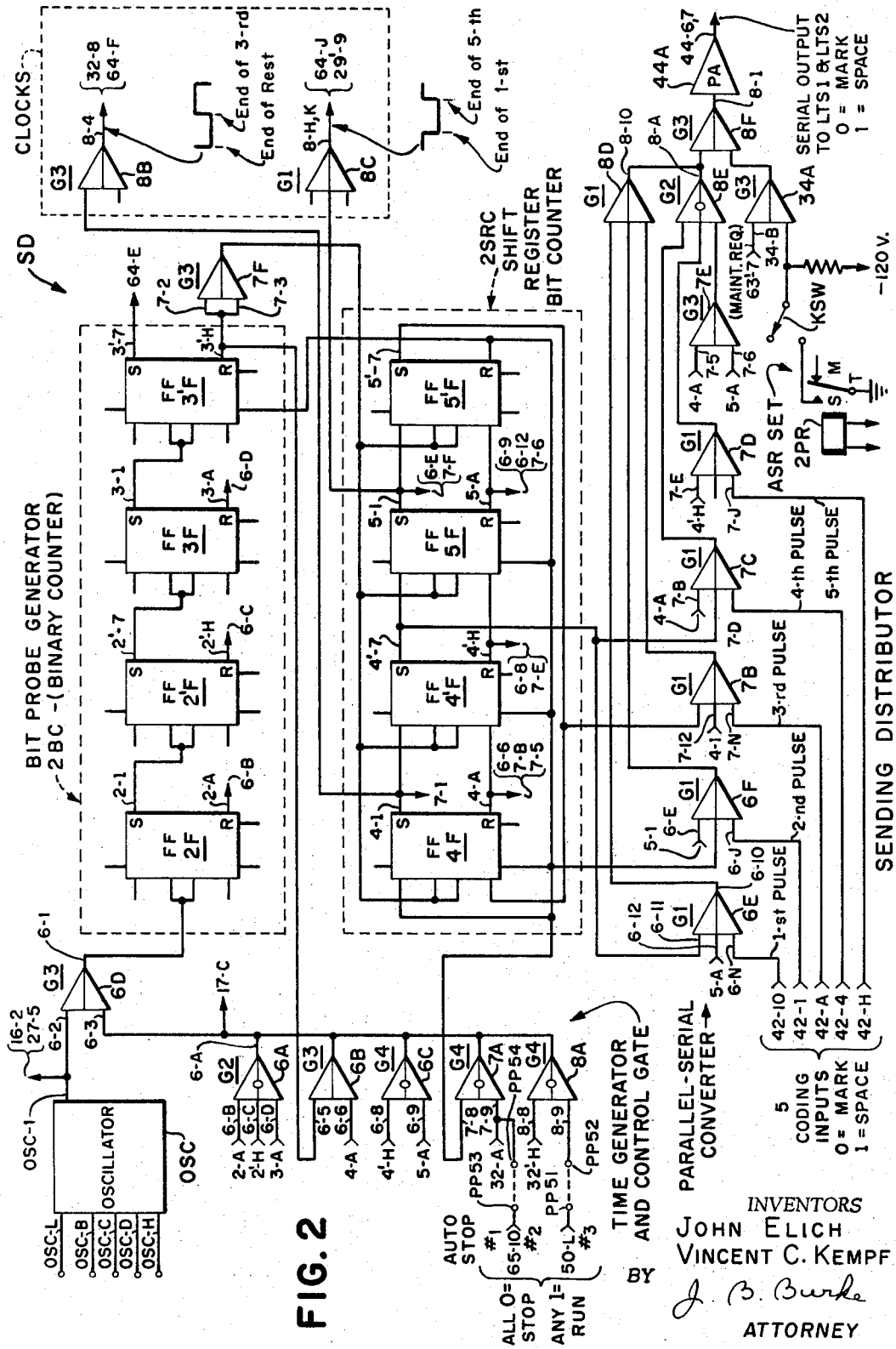
Figure 6A:
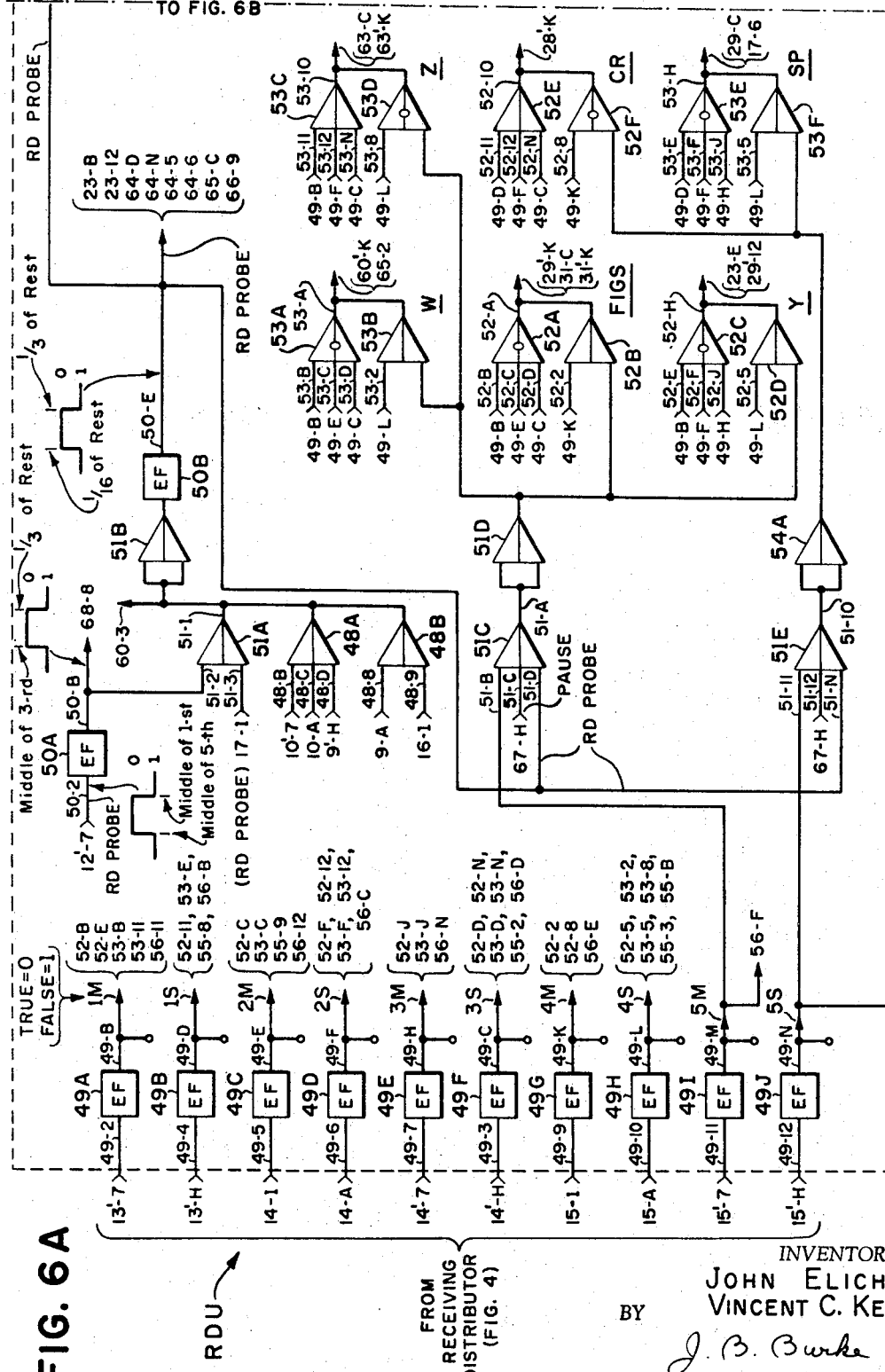
Figure 9:
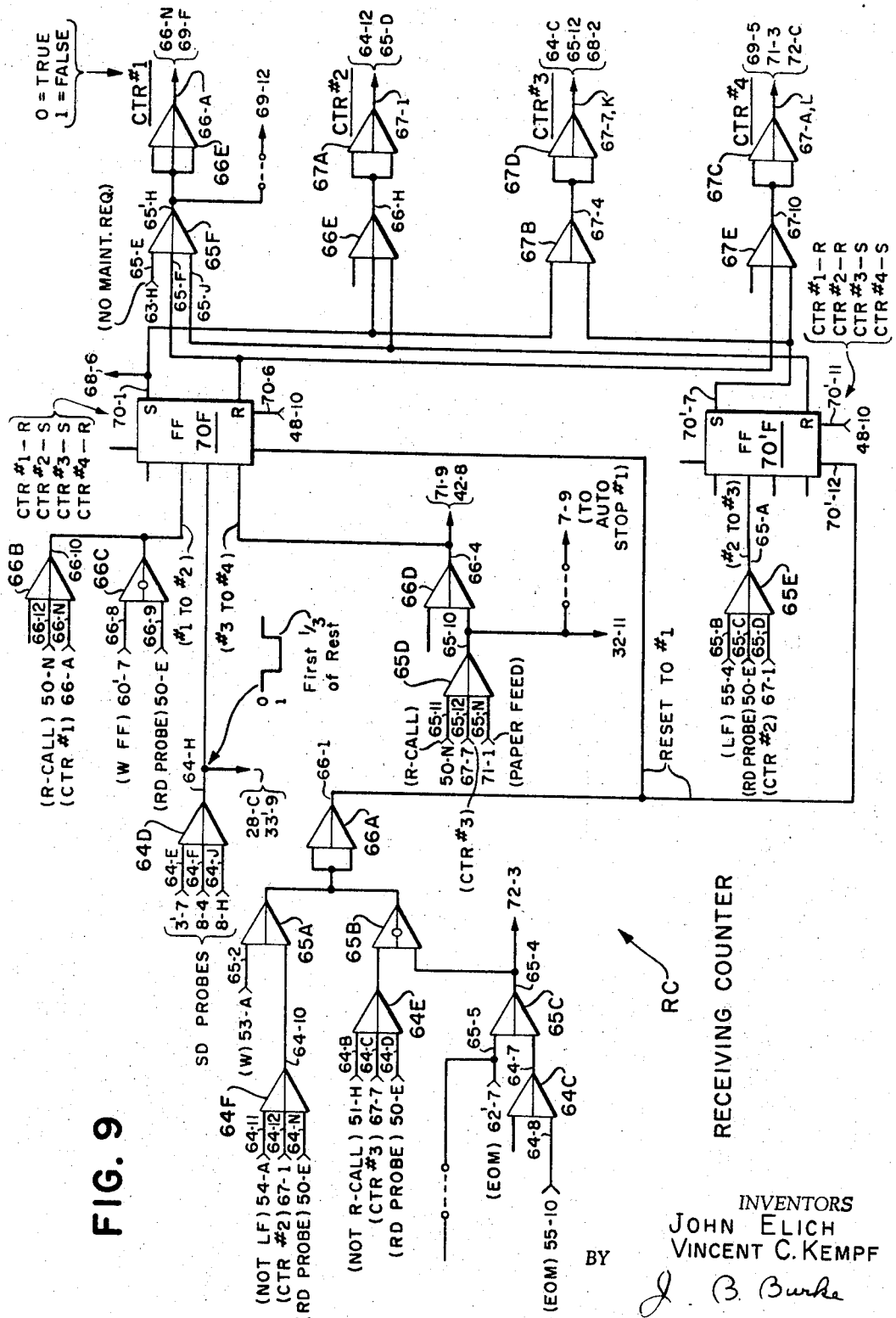
Figure 10:
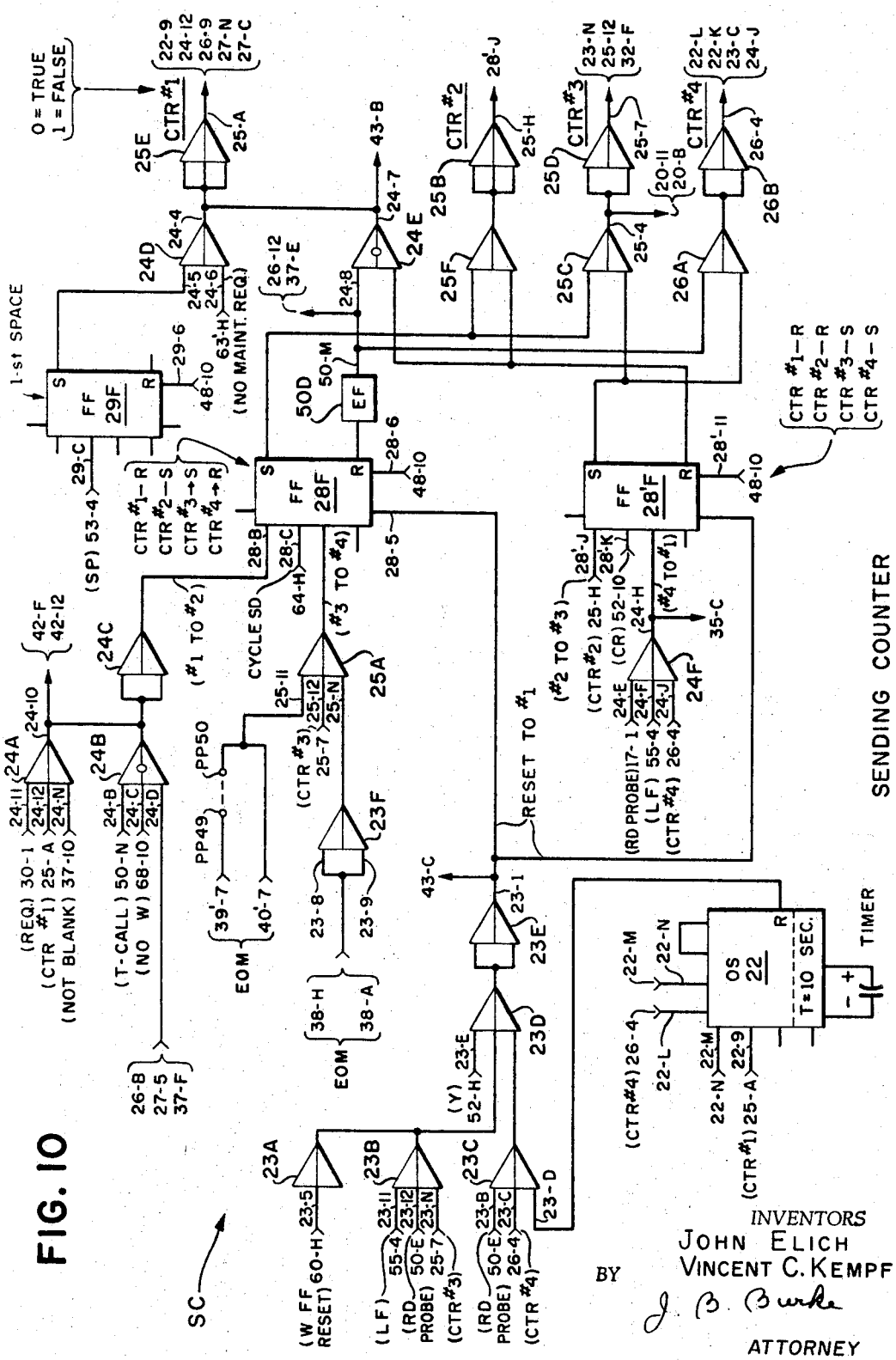
Figure 11:
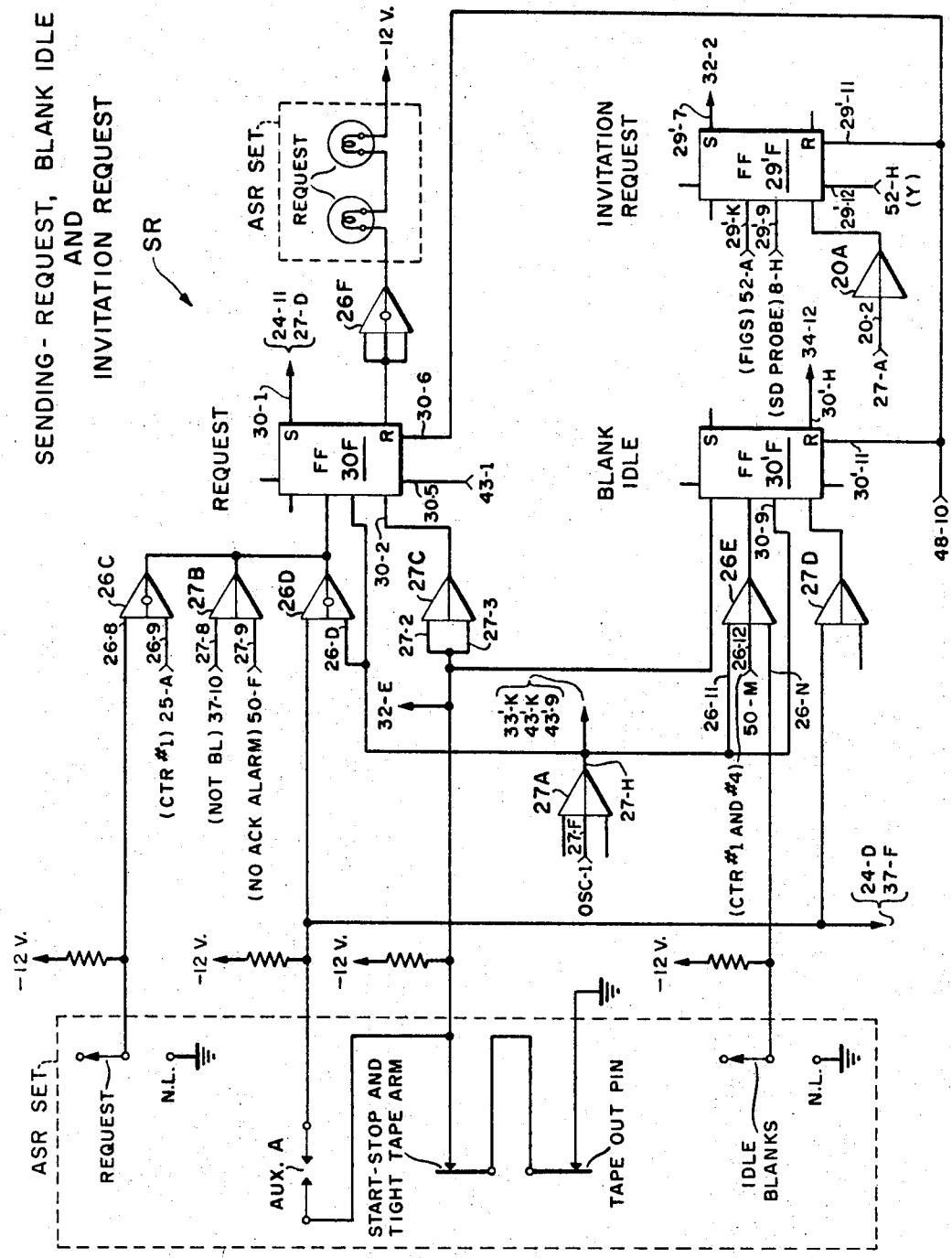
Figure 18:
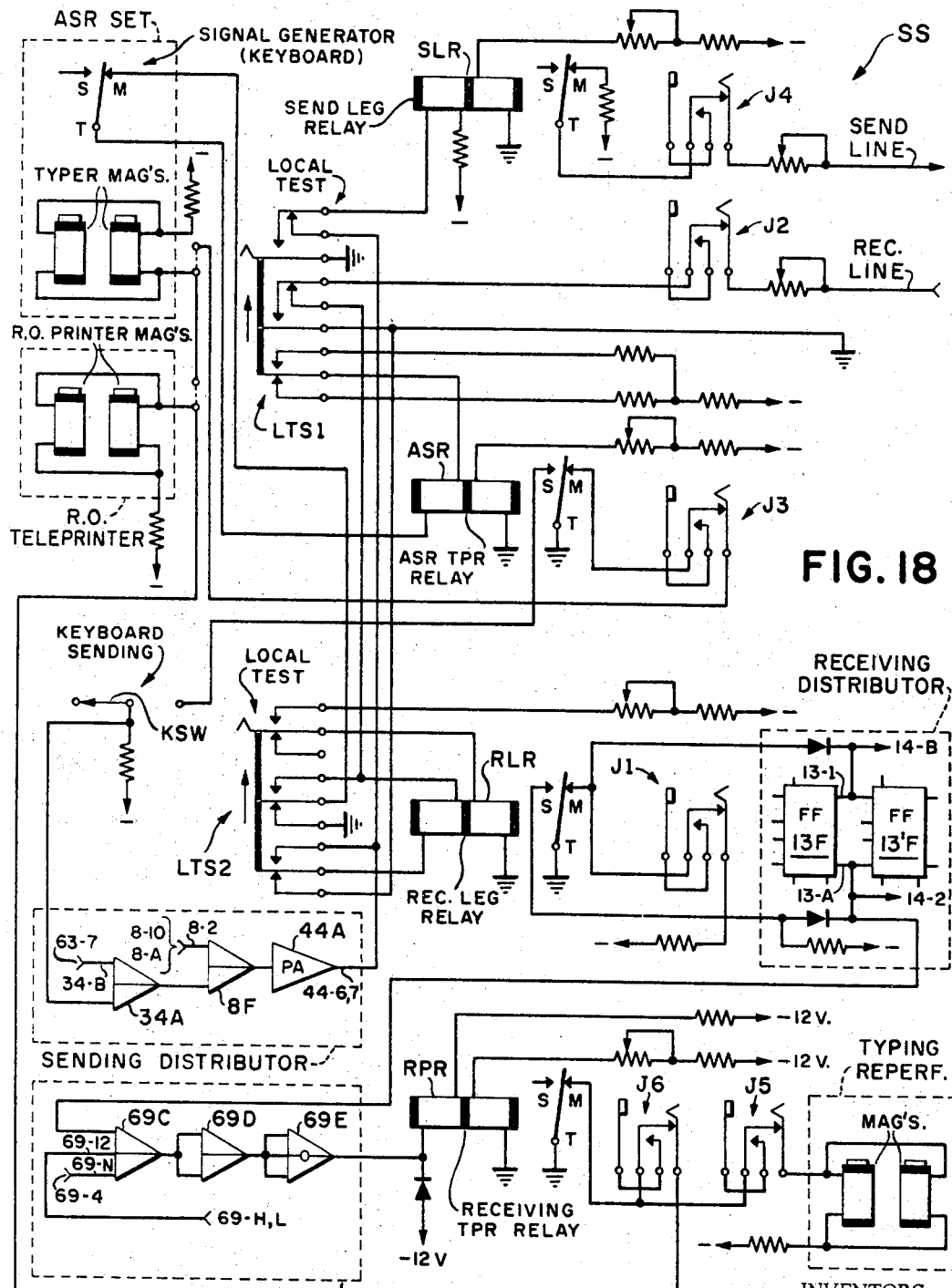
Figure 23:
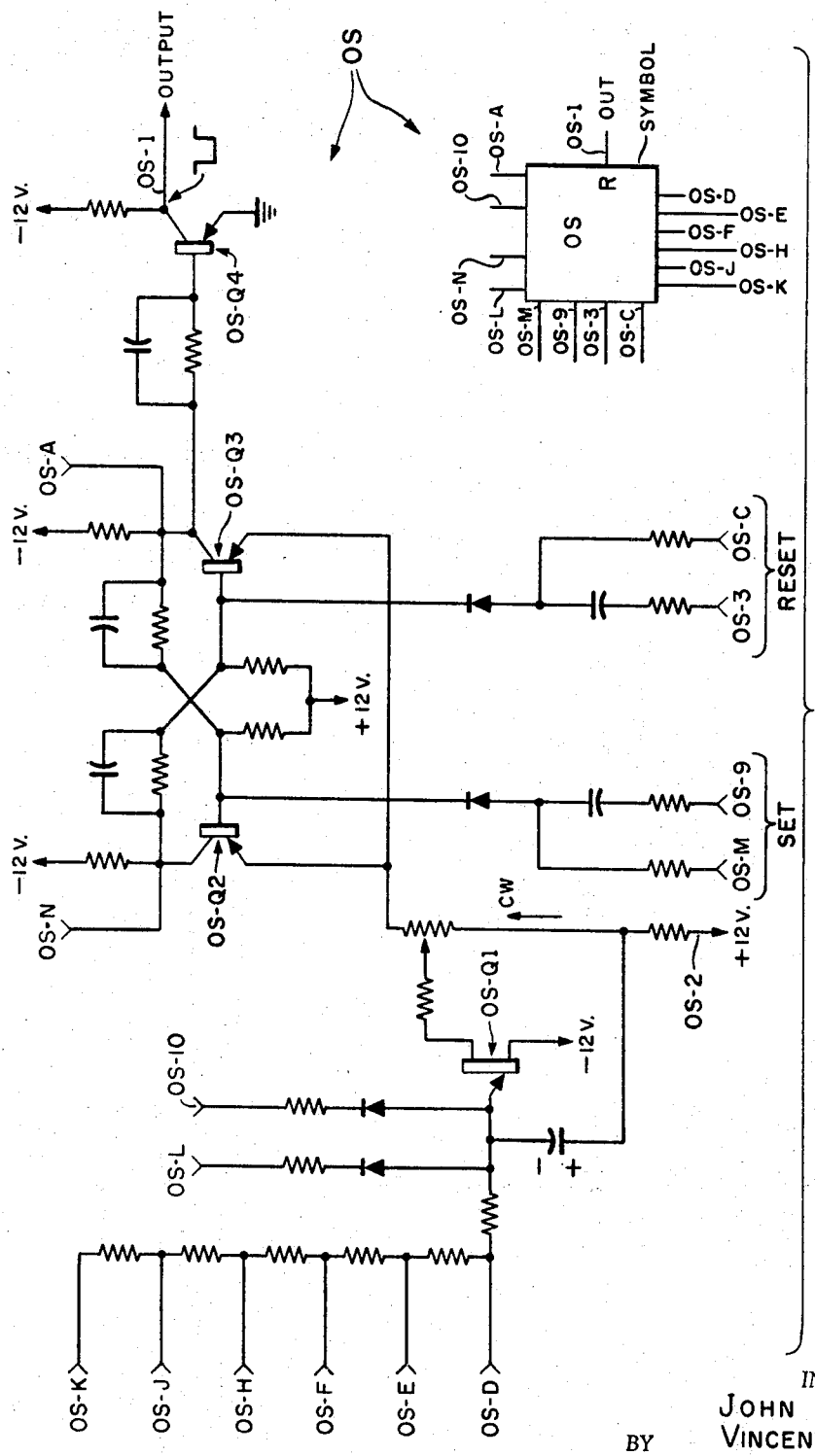

The invention will be better understood from the following detailed description taken together with the drawings, wherein:

FIG. 1 is a block diagram of a way station selector system embodying the invention;
FIG. 2 is a diagram of a sending distributor;
FIG. 3 is a graphic diagram of various waveforms of pulses in the sending distributor;
FIG. 4 is a diagram of a receiving distributor;
FIG. 5 is a graphic diagram of various waveforms of pulses in the receiving distributor;
FIG. 6A and FIG. 6B taken together constitute a diagram of a receiving decoder;
FIG. 7 is a diagram of a receiving decoder storage unit;
FIG. 8 is a diagram of receiving printer control and automatic paper feed control units;
FIG. 9 is a diagram of a receiving counter;
FIG. 10 is a diagram of a sending counter;
FIG. 11 is a diagram of sending request, blank idle and invitation request units;
FIG. 12 is a diagram of sending one cycle control, transmitter control and center close out detector units;
FIG. 13 is a diagram of sending end-of-message and blank reading units;
FIG. 14 is a diagram of a sending encoder;
FIG. 15 is a diagram of an automatic reset unit;
FIG. 16 is a diagram of receiving paper feed sense and alarm units;
FIG. 17 is a diagram of sending acknowledgement alarm and message counter units;
FIG. 18 is a diagram of a switching system interconnecting the way station selector and automatic send-receive set of the central station;
FIGS. 19A–19D are diagrams of gate circuits utilized in the way selector system;
FIG. 20 is a diagram of a flip-flop circuit;
FIG. 21 is a diagram of an automatic reset circuit;
FIG. 22 is a diagram of an emitter follower;
FIG. 23 is a diagram of a one-shot multivibrator;
FIG. 24 is a diagram of a power amplifier;
FIG. 25 is a diagram of an oscillator for generating square wave clock pulses.

Referring first to FIG. 1, there is shown diagrammatically a system including a central station or switching center CT which controls operation of a multiplicity of way stations WS-A, WS-B . . . WS-X, each having selector apparatus embodying the invention. The central station or switching center controls operation of the multi-station circuit by sequentially polling the way stations or outstations for any message traffic awaiting transmission to the central station, and by transmission of individual call letters for any selected way station which is to receive message traffic from the central station. Each way station embodying the invention is especially arranged to operate in a full duplex network.

The selector apparatus of each way station includes a receiving distributor RD which converts serial signals or pulses received via a receiving line $L_R$ to parallel signals or pulses. The parallel pulses are read in a reading and control circuit RCC which notes mark and space permutations of the received signals. The reading and control circuit RCC is arranged to read specific control characters which appear in the preamble of a received message. The reading and control circuit RCC applies control pulses to a receiving counter RC which programs a receiving teleprinter RTP in accordance with received selection and control characters. When the receiving teleprinter RTP of a selected way station has been properly programmed, answer-back signals are sent to the central station CT by a transmitter XMTR at the selected way station. The reading and control circuit RCC programs a sending distributor SD via a sending distributor control circuit SDC and via the receiving counter RC for passing the answer-back signals from the way station transmitter to a sending line $L_S$ terminating at the central station CT.

The selector apparatus at each way station or outstation further includes a sending counter SC which has as one of its functions to program the sending distributor SD for passing polling answer-back signals from the way station transmitter to the central station CT to indicate that the way station has a message awaiting transmission to the central station. Transmission of the message to the central station is accomplished via the sending distributor SD from the way station transmitter when the way station is invited to commence transmission. If the central station is not polling the way stations at a time when a way station has a message ready for transmission to the central station, this way station may send a request for polling to the central station via the sending distributor SD whereupon transmission will commence when the way station is polled and transmission is invited by the central station CT.

A brief description will now be given of the way station selector's operation. Assume that the central station CT has message traffic for sending to a particular way station, such as way station WS–B. A marking pause on the receiving line $R_L$, generated by the central station CT and lasting for a minimum duration of 120 milliseconds, will cause certain pause detector flip-flop elements in the reading and control circuits RCC at all the way stations to "set," thus preparing other flip-flop elements of the reading and control circuits RCC to function in accordance with those characters to follow in the preamble of the message.

The receiving distributor RD will convert the sequentially transmitted signal from station CT to parallel form to facilitate the reading of the subsequent characters.

The reading and control circuits RCC include gates arranged to read certain characters, including the "R" call letter, which appear in the message preamble. It is these characters which determine those particular way stations that are to receive the transmission.

The receiving counter RC is stepped by the combined effect of the reading and control circuits RCC and receiving distributor RD.

The receiving teleprinter printer control function TPC indicated in FIG. 1 refers to the blinding function performed on the receiving teleprinter RTP, and this is determined by the receiving counter RC in accordance with its program. Depending upon which stage or count that the counter RC has reached, the receiving relay of the printer RTP has either a ground or negative on its bias winding that in turn determines if the printer is to be blinded to the line or not.

The first all spacing character that is received, normally appearing as the last character in the preamble of the message, will re-set the pause detector, thereby prohibiting the continued response of the reading and control circuit RCC to those characters appearing in the message text.

In order that the central station CT may be assured that the proper way station is on line $R_L$, an answer-back feature is incorporated which is indicated as the selector answer-back function SAB and transmitted through the sending distributor SD to sending line $L_S$.

A typical preamble for a message will comprise a sequence such as mark-pause, the character "W," then "LF," which will prepare all way stations for responding to their particular call letters. The remainder of the preamble will contain the call letters of the particular station or stations destined to receive the message text and functional characters which control the receiving teleprinter RTP. An example of a preamble and message together with the response of way station WS–B thereto follows:

(1) Mark, pause. Receiving counter RC is on step No. 1; teleprinter RTP blinded.
(2) Character "W."
(3) Line feed.
(4) Character "B" (call letter). Receiving counter RC steps to step No. 2—teleprinter RTP is unblinded.
(5) L.F. (Check message paper supply.) If adequate, a relay will activate the teleprinter RTP to cause transmission of an answer-back signal (function SAB).
(6) Character "B." Counter RC steps to step No. 3—teleprinter RTP is re-blinded.
(7) L.F. Any additional drops are now called in by sending their respective call letters.
(8) Space. Counter RC steps to step No. 4; teleprinter RTP is again unblinded.
(9) Message Text. Teleprinter RTP at called station or stations will print.
(10) E.O.M. Counter RC returns to step No. 1—teleprinter RTP is re-blinded.

It will be noted that it is the LF sequence in steps Nos. 4–6 above which accomplishes the lockin of way station WS–B.

Since the selector system operates in a full duplex network, sending and receiving at one way station may be carried on simultaneously. Transmission from the way station is controlled from the central station CT by invitation via the sequential polling of the way stations for traffic that might be waiting. Since this polling is not carried out continuously, in the event a line $L_R$ has been idle for a predetermined duration the way station may submit a request for polling by the transmission of a blank character to the central station CT via line $L_S$.

The polling sequence or T-call is transmitted on the receiving line $R_L$ and will be read by the receiving distributor RD.

Reception of the T-call will be sensed by the sending distributor control circuit SDC.

The polling answer-back function PAB causes generation of a "Y" response at those way stations having traffic waiting, whereas a no-message waiting condition will result in a space being generated.

Sending counter SC which closely parallels the structure of the receiving counter RC functions to program the sending distributor control circuit SDC in accordance with the phase of the polling answer-back sequence.

As noted above, both sending and receiving may be carried on simultaneously and, therefore, provisions have been made to interrupt the sending transmission when there is a message to be received in order to permit the selector answer-back function SAB, and the receiving circuit will be temporarily blinded during the polling sequence in order to prevent the receiving teleprinter RTP from copying these characters.

*Line circuits*

The way selector is intended for either two-wire or four-wire operation; that is, a send and a receive line which may be wired for either ground return (two-wire) or loop (four-wire) operation.

The line circuits of a send-receive outstation controlled by the way selector is shown in switching system SS of FIG. 18. The receiving line relay RLR follows all line signals sent out from the switching center. The contacts of relay RLR drive the receiving printer control circuit. The receiving printer control circuit determines the response of the receiving printer tape perforator relay RPR to station selection and message signals. Sending line relay SLR is driven by power amplifier 44A coupled to the output of the sending distributor SD (see FIG. 2). Relay SLR is shown arranged for polar line transmission. Automatic send-receive teleprinter relay ASR is used to repeat signals from the local keyboard tape punching into the automatic send-receive typing units except when split automatic send-receive operation is used.

Incoming messages from the outstation are received at the R.O. Teleprinter. Message tapes are punched from the keyboard of the ASR set. The way selector can be used without the R.O. Teleprinter as a send-receive outstation. This mode of operation is known as "Split ASR" and uses the typing unit of the ASR set to receive message traffic from the switching center. The way selector can be used in conjunction with an R.O. Teleprinter or a typing reperforator as a receiving-only outstation. These basic outstation arrangements using the way selector can be used in various combinations to meet traffic requirements of a particular outstation.

Relay alignment

Relays SLR and RLR should be aligned in conjunction with the switching center using appropriate currents for make-break operation and for polar operation. Jack J4 is used for bias alignment reading and bias control potentiometer P1 is used to adjust bias if the received signals are make-break. If polar signals are used the entire bias control must emanate from the switching center and intermediate repeater points. Alignment for relay SLR is made by using jack J4 and bias control potentiometer P4.

Relays RPR and ASR are adjusted utilizing a local circuit through local test switches LTS1, LTS2. Switches LTS1, LTS2 in the LOCAL TEST position hold relay SLR (send line) and the receiving line marking, and complete a local circuit from negative battery through switch LTS1, the operate coils of relay ASR, the ASR keyboard, the operate coils of relay RLR, and the output of power amplifier 44A. The output of power amplifier 44A is controlled by the sending distributor SD (FIG. 2) marking (ground) and space (negative battery). With switches LTS1, LTS2 at LOCAL TEST, a test tape can be sent from the ASR transmitter to align relay ASR and relay RPR. Jack J5 is provided for use with a typing reperforator.

Component units

The several component units of the way selector will now be described in greater detail with particular reference to the drawing. In these component units certain basic circuits are employed. These include gate circuits, flip-flop circuits, emitter followers, power amplifier, a "one-shot" multivibrator, an automatic reset circuit, and an oscillator. Typical basic circuits of these several types are shown both schematically and by block symbols in FIGS. 19A–19D and 20–25, and are described below under the heading "Basic Circuits."

In describing the component units of the way selector certain conventions are used to denote the states of the electronic circuits. The logic terminology "0" is used to represent zero potentials, and "1" is used to represent negative potentials.

The two stable states of a flip-flop FF (see FIG. 20) are referred to as the "set" and "reset" states respectively. In the set state, terminal FF-S is at zero potential or logic 0. In the reset state, terminal FF-R is at zero potential or logic 0.

In the drawings of the several component units, the following lettering scheme is used. Terminals of circuits are indicated by a numeral corresponding to the numerical symbol of a basic circuit and a terminal numeral, both numerals being separated by a hyphen. For example, in FIG. 2 terminal 2-A of flip-flop 2F is indicated as connected to terminal 6-B. Terminal 6-B will be found at gate 6A. Only those particular terminals are specifically referred to as are necessary to an understanding of operation of the system. The remaining terminal numbers in the drawings show wiring connections necessary to assemble the units in a complete, operative system.

Sending distributor

The sending distributor SD shown in FIG. 2 is a 5-bit parallel to 7.5-bit serial converter. The 5-bit simultaneous parallel information is placed on five coding input leads 6–N, 6–J, 7–N, 7–D, 7–J, and appears as a time distributed signal at serial output lead 44–6, 7 of amplifier 44A. In this distribution start and rest bits are added to the five information bits. The start bit is the same time length as an information bit and the rest bit is 1.5 times as long as an information bit. The result of these additions is the appearance of the standard 7.5 unit teletype code at the serial output lead 44–6, 7.

The time distribution is done by means of oscillator OSC-1, a bit probe generator 2BC which is a binary counter, and a shift register bit counter 2SRC. Counter 2BC has four flip-flop stages 2F, 2'F, 3F, 3'F. Counter 2SRC has four flip-flop stages 4F, 4'F, 5F, 5'F. The two counters which are driven by the oscillator OSC–1 are controlled by pulses applied at three auto-stop leads 7–9, 8–8, 8–9 of gates 7A, 8A. When a 1 is placed on any one of the auto-stop leads input 6–3 of gate 6D becomes 0. This allows the inversion of the oscillator output to appear at output 6–1 of gate 6D, thereby causing the counters 2BC and 2SRC to run. When the three auto-stop leads are in 0 condition and all flip-flops in the two counters are reset, gate input 6–3 becomes a 1. This 1 at gate input 6–3 keeps gate output 6–1 at a constant 0 and therefore, the counters stop since the oscillator frequency is now blinded off.

The first through fifth pulse gates 6E, 6F, 7B, 7C, 7D are used to combine 5-bit parallel information with the outputs of the shift register counter 2SRC. Since all these gates are identical in operation only the first pulse gate 6E will be explained in detail. During the first pulse interval of time, gate input 6–11 from flip-flop terminal 5–A and input 6–12 from flip-flop terminal 4'–7 are 0. At all other times one of these inputs is a 1. This is shown in FIG. 3 by the waveforms W5–49 at flip-flop outputs 4–1, 4'–7, 5–1, 5'–7. If the first pulse is to appear at the serial output 44–6, 7 as a marking pulse, a 0 is placed on input 6–N. With all inputs to gate 6E now at 0 its output 6–10 is at 1. If this first pulse is to appear at the serial output 44–6, 7 as a spacing pulse, then gate input 6–N would be a 1 holding gate output 6–10 at 0 during the first pulse interval. Since the rest pulse is always marking, the rest pulse gate 7E uses only the information from the shift register counter 2SRC. This information is obtained from outputs 4–A and 5–A of flip-flops 4F and 5F.

The first through fifth pulse gate outputs and the rest pulse gate output are combined by use of gate outputs 8–10 and 8–A of gates 8D, 8E. The operation of gate outputs 8–10 and 8–A will be explained by considering the operation of the sending distributor SD for one complete character. When the sending distributor is started, the first pulse to appear at the serial output 44–6, 7 is the start pulse; see waveform W1 in FIG. 3. During this time interval the outputs of the first through fifth and rest pulse gates are 0, which causes gate outputs 8–10 and 8–A to be 1, gate output 8–1 to be 0 and the output 44–6, 7 of amplifier 44A to be 1. This drives the relay SLR (shown in FIG. 18) to spacing. During the first pulse interval, if the first pulse is to be sent marking, the gate output 6–10 is a 1. This 1 appears at gate outputs 8–10 and 8–A and causes the output of amplifier 44A to be a 0, thereby driving the polar relay SLR (FIG. 18) to marking. If the first pulse was to be spacing, then, during the first pulse interval, the gate output 6–10 would remain at 0. Since at this time all inputs to gates 8D and 8E are 0, the output of amplifier 44A will be a 1 and the relay SLR will be driven to spacing.

Provision is made in the sending distributor SD to allow transmission to be sent to the sending line via a polar relay 2PR and keyboard sending switch KSW of the automatic send-receive (ASR) set at the way station. This transmission is sent after a Maintenance Request (Pause ZZ) has been received by the way station selector. When a Maintenance Request (Pause ZZ) is received, gate input 34–B of gate 34 becomes a 0. If a Maintenance Request is not received, gate input 34–B will be a 1 and gate output 34–A will be a 0. If a Maintenance Request has been received and the maintenance sending switch KSW is in its keyboard position, then the gate output 34–A of gate 34A will be 0 when the polar relay 2PR is marking, and will be 1 when the polar relay 2PR is spacing. In order to send directly from the keyboard of the automatic send-receive set to the sending line the local test switches LST1, LST2 (FIG. 18) must be in normal position so that the output of the sending distributor SD will drive the polar relay SLR.

Waveforms W2–W9 in FIG. 3 show the waveforms of pulses obtained from the (S) outputs of the four flip-flops in counter 2BC and the four flip-flops in counter 2SRC.

Receiving distributor

The receiving distributor RD shown in FIG. 4 is a serial-to-parallel converter. The receiving distributor uses binary counter 4BC having four stages of flip-flops 9F, 9′F, 10F, 10′F, and a shift register counter 4SRC having four stages of flip-flops 11F, 11′F, 12F, 12′F. These counters produce sampling pulses located at the middle of each serial pulse. The two counters are driven by the oscillator OSC–1 (FIG. 2) used to drive the sending distributor SD. The output of the oscillator is blinded from the counter 4BC by use of gate 16D. When the outputs 16–10 of gate 16B, 16–A of gate 16C and 16–H of gate 16A become 1, that is, when all the flip-flops 9F, 9′F, 10F, 10′F in the counter 4BC are reset and the receive leg polar relay RLR is marking, the output 16–1 of gate 16D becomes a constant 0 and the counter 4BC is stopped. When the start pulse of a character is received and the receive leg polar relay RLR goes spacing, input 16–3 of gate 16D becomes 0 and the oscillator frequency appears at the gate output 16–1 to start the counters 4BC and 4SRC. Gate input 16–3 remains at 0 until the rest pulse when all the flip-flops in the counter 4BC are reset and the receive leg polar relay RLR is marking.

The first through fifth pulse flip-flops 13′F, 14F, 14′F, 15F, 15′F constitute a character storage unit SCS used to store the serial input so that it may be read in parallel form. Output 13–1 of flip-flop 13F is used to obtain a signal from the receive leg polar relay RLR that is free of bounce. This flip-flop is set when the polar relay RLR is marking and reset when the polar relay is spacing. Therefore, when the polar relay is marking, the set pedestals of the first through fifth pulse flip-flops in character storage unit SCS are at 0 and the reset pedestals are at 1. The first through fifth pulse flip-flops are triggered by a pulse from the shift register counter 4SRC at the middle of their particular pulse; for example, the first pulse flip-flop 13F would be triggered at the middle of the first serial pulse. A particular pulse flip-flop will be set if its pulse is spacing. The character last stored remains on the first through fifth pulse flip-flops and is not cleared out.

FIG. 5 shows the waveforms of pulses W1′ applied to the first through fifth pulse flip-flops. Waveforms W2′–W9′ show the waveforms of pulses at the (S) outputs of the four flip-flops in counter 4BC and the four flip-flops in counters 4SRC.

Automatic reset

When the power is first turned on to the way selector, the automatic reset circuit 50′ shown in FIG. 15 produces a negative pulse at its output 50–1 for a short interval of time. This pulse is applied to the flip-flop reset terminals listed in FIG. 15 to drive these flip-flops into their idle or unstored state.

Control signals

Certain signals or characters are sent either to or from the way station selector for selection purposes. A single or block of control characters is preceded by a pause. A space is sent by the switching center CT (FIG. 1) to identify the end of a block of control characters if these control characters are for the receiving side or unit of the way selector. If the control characters are for the sending side or unit of the selector, a space will be sent at their completion only if the switching center has interrupted message transmission to send these characters.

An * identifies those characters sent from switching center CT. All other characters are transmitted from the way station selector.

*Pause—120 milliseconds of idle or marking receiving line; used to identify start of a selection character block.

*W—precedes a control character for the receiving unit and identifies the succeeding control characters as receiving unit cycling.

*R-Call—a particular character in the block ABCDEFGHIJKLNPRSUQ used to selected the receiving unit of a particular outstation. R-Call and T-Call characters are identical for a particular outstation.

Answer-back—Inverse of R-call, i.e., if R-Call is A, answer-back is M.

*Space—identified end of selection sequence for the receiving unit and is also received by the selector if message transmission was stopped by switching center for receive unit selection.

*Line feed—(1) used to check for motion of paper in friction feed printer; (2) acknowledgement from switching center of the receipt of an End-of-Message.

*ZZ—maintenance request for conference. Unblinds all printers on circuits and allows transmission from the keyboard of the ASR Set.

*Blank—end of maintenance conference.

Blank—request for cycling to invite outstations to send to switching center.

*Figures—Set Invitation Request flip-flop to allow any outstation to send an invitation request (Blank) to the switching center.

*Y—(1) transmitted by switching center at the start of sending unit cycling to reset the Invitation Request flip-flops so that an invitation request (Blank) can not be sent by the outstation; (2) if switching center does not receive "yes" or "no" answer-back from outstation sending unit; (3) if outstation transmitter stops for more than ten seconds.

*T-Call—a particular character in the block

ABCDEFGHIJKLNPRSUQ used to invite the sending unit of a particular outstation.

*Carriage return—used to start outstation transmitter.

Y—"Yes" answer-back from sending unit indicating that it has a message to transmit.

Space—"No" answer-back from sending unit indicating that it has no messages to transmit.

Receiving decoder

The receiver decoder RDU shown in FIGS. 6A, 6B is used to read all characters received by the way station or outstation. Each received character is converted from serial to parallel form by the receiving distributor RD. The ten parallel outputs of the receiving distributor are connected to ten emitter followers 49A–49J to obtain driving power. The outputs of these emitter followers are referred to as the 1M–5M and 1S through 5S leads. If the first pulse is marking, the 1M lead will be 0 and the 1S lead will be a 1 and vice versa if the first pulse is spacing. These 1M through 5S leads are gated with particular probe pulses from gates 10′F, 12′F of the receiving distributor RD to obtain character readouts. The waveforms W5′, W9′ of the receiving distributor probe pulses are shown in FIG. 5.

The operation of the W, Z, FIGS. CR, Y and SP reading gates are identical and, therefore, the operation of one of these gates will be described. Outputs 51–A and 51–10 of gates 51C and 51E are used to probe these character reading gates during a specific time interval. Both of gates 51C and 51E have common inputs from the pause detector gate 67F (FIG. 7) and the receiving distributor probe. Gate inputs 51–C and 51–12 of gates 51C and 51E will be at 0 between the time a pause and a space are received. The receiving distributor probe inputs 51–D and 51–N are 0 from the middle of the fifth to the end of the first one-third of the rest pulse. Gate 51C has a 5M input applied at input 51–B and gate 51E has a 5S input applied at input 51–11. Therefore, after a pause and before a space has been received, the gate output 51–A will be a 1 if the fifth pulse is marking from the middle of the fifth pulse to the end of the first one-third of the rest pulse. This is the same condition that appears at the gate output 51–10 if the fifth pulse is spacing. Therefore, considering the W reading gate output 53–A, if a W is stored in the receiving distributor after a pause and before a space, its output will be 1 from the middle of the fifth pulse to the end of the first one-third of the rest pulse of this W.

The R-Call T-Call assembly in FIG. 6B has five of its inputs connected so that any one of eighteen possible call characters may be read by this gate assembly. One call at gate input 54–9 is the pause detector to limit the readout of gate 54C to the interval between a pause and a space. One call at gate input 54–8 is a probe from the receiving distributor RD. This is a 0 from the middle of the fifth pulse to the middle of the first pulse. Therefore, if the R-Call or T-Call character is stored in the receiving distributor after a pause and before a space, the output 51–H of gate 51F will be a 1 from the middle of the fifth pulse of the call character to the middle of the first pulse of the next character received.

The LF gate 55A is gated with only the output of the receiving distributor RD. These outputs which are at 0 when an LF is stored in the receiving distributor causes the gate output 55–7 to be a 1. The gate output 55–7 is also gated with the pause detector by use of gate 54D. the receiving distributor RD and a receiving distributor between a pause and a space, the gate output 54–A will be a 1.

The first through third character EOM gates and the BL gate all operate identically so that only the operation of the BL gate will be explained. The inputs of BL gates 56F, 55F are connected to the 1S through 5S outputs of the receiving distributor RD and a receiver distributor probe pulse which is a 0 from the middle of the fifth to the end of the first one-third of the rest pulse. Therefore, when a blank is stored in the receiving distributor, the gate output 56–A will be a 1 from the middle of the fifth pulse to the end of the rest pulse of this blank.

*Receiving decoder storage*

Receiving decoder storage units RDS are shown in FIG. 7. They include Pause Detector, W Flip-Flop, End-of-Message and Maintenance Request.

In the Pause Detector, when the receiving line is idle, the receiving distributor RD is stopped and one-shot multivibrator input 59–J is 0. When this input is a 0 for approximately 120 milliseconds, multivibrator 59 of the pause detector will be driven to its set state, that is its output will be a 1. When a space is received and the gate output 53–H of gate 53E (FIG. 6A) changes from a 1 to 0, at the end of the first one-third of the rest pulse, this positive pulse is applied to multivibrator input 59–3 to reset the pause detector.

When a W is received, the W flip-flop 60'F is set by the fact that the output 53–A of the W reading gate 53A (FIG. 6A) changes from a 1 to a 0 at the end of the first one-third of the rest pulse. The W flip-flop 60'F is reset when the pause detector multivibrator 59 switches from set to reset.

*Receiving counter*

The operation of the receiving unit of the way selector is programmed by means of a two-stage counter RC shown in FIG. 9. The counter has two flip-flops 70F and 70'F which are capable of four counts. The states of the two flip-flop stages in the counter are obtained by use of the outputs 65–H, 66–H, 67–4, 67–10 of four gates 65F, 66E, 67B, 67E. The four counts are obtained in the following listed flip-flop output states:

| COUNT | Flip-Flop Output 70-1 | Flip-Flop Output 70-7 |
|---|---|---|
| #1 | Reset | Reset |
| #2 | Set | Reset |
| #3 | Set | Set |
| #4 | Reset | Set |

When the counter RC is in count #1, both flip-flops 70F, 70'F are reset, and therefore the two gate inputs 65–F and 65–J of gate 65F are at 0. As long as there is no Maintenance Request ZZ from flip-flop 63'F (FIG. 7), the gate input 65–E is at 0. With all inputs to gate 65F at 0 its output 65–H, K is a 1 and, therefore, the gate output 66–A, K is a 0. This 0 indicates that the way selector is in count #1. When the way selector is in counts #2, #3, or #4, the gate outputs 67–1, 67–7, K or 67–A, L will be 0 respectively.

*Receiving unit—Count #1*

When the power is turned on, the automatic reset circuit A–R (FIG. 15) applies a pulse to reset both flip-flops 70F, 70'F in the receiving counter RC, insuring that it is in count #1. In count #1, the gate output 65H, K (FIG. 9) is a 1. This output is patched to input 69–12 of gate 69C (FIG. 8) for copying every channel number. With gate input 69–12 a 1 the output 69–10 of gate 69C (FIG. 8) is a 0, regardless of the condition of gate input 69–11 (FIG. 8) which is connected to the receive line, thereby holding the receive printer polar relay marking. Therefore, the receiving printer is blinded and will not copy any characters from the receive line.

When an outstation or group of outstations are to receive a message, the selection cycle sent by the switching center to the way selectors is:

Pause W A LF A B LF B E LF E SP MESSAGE TEXT. Note that in this selection cycle, the WS–A, WS–B and WS–E outstations are to receive the message. When the pause is received, the Pause Detector (FIG. 7), is set. When the Pause Detector is set, the W, R-Call, LF and space character reading gates (FIGS. 6A, 6B) are conditioned so that the may read out as described previously. When the W is received, the W flip-flop 60'F (FIG. 7) is set. The W flip-flop being in its set state stops the sending distributor and transmitter in the sending unit, if it has been running, so that the answer-back may be sent to the switching center. Control of the sending distributor and transmitter is described below. Receipt of this outstation's first R-Call character causes the output 50–N of emitter follower 50C (FIG. 6B) to be a 0 from the middle of the fifth pulse of the R-Call to the middle of the first pulse of the next character. The output of emitter follower 50C is applied to gate 66B (FIG. 9) at input 66–12. Since the counter is in count 1 and the W flip-flop is set, input 66–N of gate 66B and input 66–8 to gate 66–C are also 0. A probe pulse from the receiving distributor is also applied as an input to input 66–9 of gate 66C. Combining these four inputs, the gate output 66–10 is a 1 from the middle of the fifth to the end of the first one-third of the rest pulse of the first R-Call character. When gate output 66–10 changes from its 1 to its 0 state, a trigger pulse is applied to flip-flop 70F to set its output 70–1. With flip-flop 70F set at 70–1 and output 70–7 of flip-flop 70'F reset, the counter RC is now in count #2.

*Receiving unit—count #2*

With the receiving counter RC in count #2, the output 69–10 of gate 69C (FIG. 8) will be 0 for a mark and 1 for a space. The gate output 69–10 will drive the Receive Printer Polar Relay RPR through gate outputs 69–1 and 69-A. Relay RPR in turn drives the receiving printer so that incoming line signals are now copied on the printer.

When the receiving counter is in counts #2 and #3, input 68-6 to gate 68C (FIG. 16) is a 0 causing the output 44-F of power amplifier 44B to be a 0, thereby operating the Line Feed Detector Magnet in the ASR set. This magnet is used only with a friction feed page printer. Operation of this magnet causes a knife blade, connected to the line feed detector contacts, to pierce the paper in the printer. Upon the receipt of the line feed signal between the first and second R-Call characters, the paper in the page printer wil advance one line causing the line feed detector contacts to transfer. When these contacts transfer, a ground is applied to the set output 71-1 of flip-flop 71F (FIG. 16). Note that when a friction feed type of printer is used, flip-flop output 71-1 will not be set unless paper is present and the paper can advance upon reception of a line feed signal.

The next character sent from the switching center should be a line feed (LF). Upon the receipt of this line feed the output 65-A of gate 65E (FIG. 9) will change from a 1 to a 0 at the first third of the rest pulse. This 1 to 0 transition will cause output 70-7 of flip-flop 70'F to be set, thus placing the counter RC in count #3.

If the character received from the switching center is not a line feed (LF), the counter will be reset to 1, which will return the way selector to its idle state. If this character is not a line feed (LF), input 64-11 to gate 64F (FIG. 9) will be a 0 during the receiving distributor probe time. Therefore, the gate output 64-10 will be a 1. This action will generate a 1 to 0 transition on the output 66-1 of gate 66A resetting flip-flop output 70-1, thus driving the counter RC to count #1.

Receiving unit—count #3

With the counter in count #3, the way selector is looking for the second R-Call from the switching center. Upon receipt of this R-Call, input 65-11 to gate 65D (FIG. 9) becomes a 0. This 0 condition will remain until the middle of the first pulse of the next character. If the paper feed flip-flop 71F (FIG. 16) is set at output 71-1, the input 65-N to gate 65D will also be a 0. This causes the gate output 65-10 to be a 1.

At this time the inverse of the R-Call is sent to the switching center as acknowledgement that the way selector is properly selected. In order to send the answerback, the information must be placed through the sending encoder SE (FIG. 14) on to the sending distributor or coding inputs. When gate output 65-10 of gate 65D becomes a 1, gate output 66-4 becomes a 0. Gate output 66-4 becoming a 0 is again inverted to drive the gate output 42-7 of gate 42F (FIG. 14) to its 1 state. The gate output 42-7 is patched for the spacing pulses of the R-Call character. If in this instance the R-Call character is an A, the gate outputs of gate 42-A, 42-4, 42-H are driven into their 0 state. This codes a mark condition into the third, fourth and fifth coding inputs of the sending distributor SD (FIG. 2). Thus it codes the sending distributor to send the inverse of an A (M) to the switching center. The operation of cycling the sending distributor to send this answer-back is described below under "Sending Unit—Count #1". When the sending distributor is cycled, gate output 64-H of gate 64D (FIG. 9) is used to develop a pulse which is a 1 during the first third of the rest of the sending distributor. Therefore, at the end of the first third to the rest there will be a 1 to 0 transition at the gate output 64-H. This transition is used to reset flip-flop 70F, thereby placing the counter RC in count #4.

If upon receipt of the R-Call character in count #3 the Paper Feed Sense flip-flop 71F (FIG. 16) is not set, the Paper Feed Alarm flip-flop 71'F will be set causing the No Paper Feed lamp NPF to light. The operation of setting the Paper Feed Alarm flip-flop 71'F will now be described. With the counter RC in count #3 input 68-2 to gate 68D (FIG. 16) will be a 0. If the Paper Feed Sense flip-flop 70F is reset, input 68-9 to gate 68E will be a 0. Therefore, upon receipt of the R-Call character input 68-3 to gate 68D will be a 0 from the middle of the fifth pulse of the R-Call character to the middle of the first of the next character. The receiving distributor probe 50-B from emitter follower 5A (FIG. 6A) is gated into input 68-8 of gate 68E. This probe pulse is a 0 from the middle of the third to the first third of the rest pulse. Therefore, at the first third of the rest pulse of the R-Call character when input 68-8 of gate 68E becomes a 1, the output 68-7 of gate 68E will become a 0. This transition will set the paper feed alarm flip-flop 71'F.

Once the Paper Feed Alarm flip-flop 71'F is set it can be reset by two means. One method of resetting the flip-flop is to operate the No Paper Feed switch N.L. (FIG. 16). This places a ground on the reset R output 71'-H of flip-flop 71'F which will drive it to its reset state. The Paper Feed Alarm flip-flop 71'F can also be reset if the paper feed function is performed correctly the next time the selection sequence is sent from the switching center. This is done by the output 66-4 of gate 66D (FIG. 9) as a reset trigger for flip-flop 71'F. The gate output 66-4 will become a 0 when the R-Call character is received; the counter is in count #3 and the Paper Feed Sense flip-flop 71F is set.

Receiving unit—count #4

With the receiving counter now in count #4, the receiving printer is again blinded so that the selection characters for the other outstations that are to receive the message are not copied. Input 69-5 to gate 69F (FIG. 8) is now a 0 (counter RC in count #4) and input 69-6 is also a 0 (multivibrator 59 (FIG. 7) of pause detector RDS is set) which causes gate output 69-4 to be in its 1 state. With input 69-N of gate 69C a 1, its output is a steady 0 and cannot follow receiving line signals.

When the counter RC has stepped to count #4, the Line Feed Detector Magnet (FIG. 16) is released since input 68-6 to gate 68C is at this time a 1. The 1 causes the input to power amplifier 44B to be a 0, thereby turning it off and releasing the Line Feed Detector Magnet.

When all appropriate selectors have been selected, the end of selection sequence character space is sent from the switching center. Receipt of this space will cause input 17-6 to gate 17D (FIG. 7) to be a 1 from the middle of the fifth to the first third of the rest pulse. This pulse will be transferred through to the gate output 17-10 of gate 17E and thus at the first one-third of the rest pulse, when the gate 17-10 changes from a 1 to a 0, the Pause Detector multivibrator 59 will be reset. When the Pause Detector is reset, the R output 59-1 becomes a 0 and the 1 to 0 transition on its output is used to trigger the W flip-flop 60'F to its reset state at output 60'-7.

When the Pause Detector is reset the receiving printer is again unblinded since at this time input 69-6 to gate 69F (FIG. 8) is in its 1 state. This places a 0 on the input 69-N to gate 69C and, since the input 69-12 is also a 0, gate 69C can follow the line signals from the receiving line.

If the sending distributor in the send side had been running before the receipt of the W preceding the receiving selection cycle, it will be restarted at this time. The sending distributor is stopped to allow the answer-back character (inverse of R-Call) to be sent to the switching center. The operation of cycling the sending distributor is described below in "Sending Unit–Count #2."

If the space at the end of the selection sequence is not read by the way selector the next W received will cause the counter RC to reset to 1. Note that this W could be part of the message text or the start of the next selection sequence. Failure to receive this space at the selector causes a condition known as a "selector letter only," meaning that the selector R-Call character is printed and is not preceded by the message text. A "selector letter only" requires visual recognition by the operator and demands a service message to the switching center to guard against a lost message.

At the end of the receiving selection cycle, defined by a space, the switching center may at its discretion generate a polling sequence which invites the outstation to send into the switching center. This polling sequence will be preceded by a pause which will set the Pause Detector as described above. With the receiving unit still in count #4 setting of the Pause Detector causes input 69–6 of gate 69F to be a 0 thus causing its output to be a 1. This 1 causes the output 69–10 of gate 69C to be a constant 0, thereby blinding the Receiving Printer from the receive line. The printer is blinded at this time to prevent copying any of the polling sequence characters. At the end of this polling sequence the switching center will send a space. This space will again reset the Pause Detector multivibrator 59, as previously described, and unblind the printer.

*End of message*

The end-of-message reading circuits for the receiving unit will now be explained. The end-of-message sequence is FIGS. J. LTRS. When a FIGS. character is received the output 54–10 of FIGS. reading gate 54D (FIG. 6B) will be a 1. This 1 will cause the set pedestal to input 61–B of flip-flop 61F (FIG. 7) to be a 0 and the reset pedestal to input 61–2 to be a 1. The trigger inputs to flip- flop 61F are driven by gate 64B whose output 64–4 provides a pulse that is a 1. Therefore, at the first ⅓ of the rest pulse of the FIGS. character flip-flop 61F will be set. Note that the next non-FIGS. character will reset this flip-flop. With flip-flop output 61–1 set, a 0 is placed on the set pedestal applied to input 61–J of flip-flop 61′F. Therefore, if the next character received is a J (second character of end-of-message) gate output 55–10 will be a 1. The 1 to 0 transition of gate output 55–10 is used to trigger flip-flop 61′F to its set state. The set output 61′–7 of flip-flop 61–7 is applied as an input to gate 65C (FIG. 9) and is thus a 0 when the sequential combination FIGS. J has been received. The output of the third character EOM gate 56D is applied as an input to gate 64C. Thus when the character LTRS. is received the output 64–7 of gate 64C will be a 0. Therefore, both inputs to gate 65C will be a 0 when the LTRS. character of the sequential combination FIGS. J. LTRS. is received. Thus this causes the output 65–4 of gate 65C to be a 1 when the LTRS. of FIGS. J. LTRS. is received. If this pulse is followed through the gating series, it will be seen that the output 66–1 of gate 66A will be the same pulse that appears on the output 65–4 of gate 65C. This pulse will reset flip-flop 70′F through terminal 70′–12 and drive the counter RC to count #1.

It will be understood from the foregoing that provisions are made for a total End-of-Message designation consisting of five characters, the actual number used being dependent upon requirements. The characters are stored on the flip-flops 61F, 61′F, 62F, 62′F.

When the end-of-message is read the 1 to 0 transition on the output of gate 65C is used to reset the one-shot multivibrator 72 (FIG. 8). With the one-shot multivibrator its reset state power amplifier 73 will be turned on, energizing the Automatic Paper Feed Solenoid. The one-shot multivibrator 72 will remain in its reset state for a time interval determined by the patching of terminals 72–D, 72–E, 72–F, 72–H, 72–J, 72–K. This time interval determines the length of time the Automatic Paper Feed Solenoid is energized and thus the amount of paper that is fed out. If paper feed-out is used in the selector, the switching center will wait for a timed interval before it sends its next selection sequence to allow time for the paper-feed operation to take place.

If the selector does not read the end-of-message sequence the next pause W received from the switching center will reset the counter to #1. When the W character is received gate input 65–2 of gate 65A will be a 1 from the middle of the fifth pulse to the first one-third of the rest pulse. This pulse will appear on the output 66–1 of gate 66A causing flip-flop 70′F to be reset which returns the counter RC to count #1.

*Receiving unit-count 0—maintenance request*

If a Maintenance Request signal, "pause ZZ," is received from the receiving counter RC in count #1 the counter will be forced into count 0 which will unblind the printer and disable the normal section sequence. Count 0 is that count in which the counter #1, #2, #3 and #4 leads are all at negative potential.

When the first Z of the Maintenance Request signal is received, the Z reading gate 53C (FIG. 6A) will have a 1 to 0 transition at the first one-third of the rest pulse. This transition is used to set flip-flop 61F (FIG. 7). With flip-flop 63F set, a 0 is placed via output 63–1 on the set pedestal terminal 63′–J of flip-flop 63′F. Therefore, when the second sequential Z is read flip-flop 63′F will be set. With flip-flop 63′F set a 1 is placed on input 65–E of gate 65F (FIG. 9) which will hold the Counter #1 66–A lead in its 1 or false state. Therefore, if the Counter #1 lead 66–A is false the counter RC can never step to count #2 and is thus blocked from its normal operation.

With the counter RC in count 0 the receiving printer is unblinded since input 69–12 to gate 69C (FIG. 8) is now a 0 and the gate output 69–10 now follows line signals.

The end of the Maintenance Request signal is the character blank. When this blank is received, the output 56–A of gate 56F (FIG. 6B) changes from a 1 to a 0 at the first one-third of the rest pulse. This transition is used to reset flip-flop 63′F. With this flip-flop reset input 65–E to gate 65F is again a 0 and the Counter #1 lead 66–A is in its true or 0 state.

*Sending counter*

The operation of the sending unit or side of the way selector is programmed by the sending counter SC (FIG. 10). This component includes a two-stage binary counter having two flip-flops 28F, 28′F. These two flip-flops are capable of four counts. The states of these flip-flops are:

| COUNT | Flip-Flop 28F | Flip-Flop 28′F |
|---|---|---|
| #1 | Reset | Reset |
| #2 | Set | Reset |
| #3 | Set | Set |
| #4 | Reset | Set |

The four counts of the two flip-flops are obtained in the same manner as in the receiving counter described above. A count 0 condition can also be obtained if the counter SC is in count 1 by driving the Counter #1, #2, #3 and #4 leads 25–A, 25–H, 25–7, 26–4 all to their false or 1 condition. This count 0 is used for two conditions, (1) when the power is first turned on and (2) for the case when a Maintenance Request (ZZ) signal is received. The Maintenance Request reading circuit was described above. When this ZZ combination is received input 24–6 of gate 24D becomes a 1. This will keep the counter #1 lead 25–A in its false or 1 state.

When the power is first turned on at the selector the counter is also driven into its count 0 state. This is done to guard against the case in which the power may be turned on in the middle of receive unit cycling, that is after the W has been sent from the switching center. When the power is turned on the W flip-flop would be in its reset state (auto reset) and, since pauses on the receive line occur in the middle of receive unit cycling, the Pause Detector would be set. Therefore, an R-Call character sent from the switching center at this time could be interpreted as a T-Call character. To guard against this condition a space character, end of receiving unit selection, must be received before the counter is put in count #1. When the first space character is received the space reading gate 53F (FIG. 6A) is used to trigger flip-flop 29F into its set state placing a 0 signal on input 24–5 of gate 24D. This 0 signal will now allow the counter #1 lead 25–A to change to its true or 0 state.

*Sending unit—count #1*

When tape is loaded into the transmitter it is desired to idle the blank character that precedes the message in order to sense the presence of a blank in the tape. This is accomplished via the use of a blank reading circuit shown in FIG. 13, including gates 37D, 37E, 37F. Input 37–E of gate 37F is a 0 when the counter is in count #1 or #4 so that blanks may be idled in count #1 or #4. Input 37–F of gate 37F is a 0 if the Auxiliary A contact of the transmitter ASR set (FIG. 11) is closed and the start-stop tight tape arm and tape-out pin are all closed. Therefore, if all the inputs to gates 37D, 37E, 37F are 0 the output of the gates will be a 1. This 1 signal is applied to input 34–11 of gate 34C (FIG. 12) causing its output to be a 0. This signal will cause the output of the power amplifier 35 to be a 0 energizing the transmitter clutch magnet. Thus the transmitter will be stepped until a not-blank character is sensed at which time the output of gates 37D, 37E, 37F will be a 0.

The gates 36A–36E store the last character sensed. Therefore, when a new tape is loaded into the transmitter, the gates might have a not-blank character stored on them and therefore, the output of blank reading gates 37D–37F would be 0 and the transmitter clutch would not be energized. To overcome this difficulty the blank idle flip-flop 30′F (FIG. 11) is used. The set pedestal 30–5 of flip-flop 30F is a 0 if the Start-Stop Tight Tape Arm and the Tape-Out Pin are closed. Therefore, if the counter is in count #1 or #4 input 26–12 to gate 26E a 0 and the Blank idle push button in the ASR set is depressed, (input 26–N is a 0) input 26–11, which is an inversion of the distributor oscillator frequency, will cause a 1 to 0 transition at the output 26–11 of gate 26E. This will set the blank idle flip-flop 30′F. With flip-flop 30′F set, input 34–N to gate 34C (FIG. 12) is a 1 which will energize the transmitter clutch magnet. When the Auxiliary A contact of the transmitter opens, a 0 signal is applied to the reset pedestal of flip-flop 30′F. The reset trigger applied to terminal 30–9 is driven by the inversion of the oscillator frequency so that the blank idle flip-flop 30′F will be reset when the reset trigger changes from a 1 to a 0.

A request flip-flop 30F (FIG. 11) is used to store the information that a message or series of messages are ready to be sent to the switching center. This storage is used so that the operator may cut a series of messages in tape form, load them into the transmitter, press the request switch once and send the whole series of messages to the switching center. If the sending counter is in count #1, input 27–9 to gate 27B (FIG. 11) is a 0. If a not-blank character is stored on the gates 36A–36E input 27–8 to gate 27B will be a 0. Since this blank reading gate is clocked with the Auxiliary A contact of the transmitter, the only time we can use the 0 output condition of the gate to indicate not-blank is during the closure of the Auxiliary A contact. The Auxiliary A contact is also gated into gate 26C. For the input to be a 0, the Start-Stop Tight Arm and Tape-Out Pin in the ASR set must also be closed. Input 27–9 to gate 27B is a 0 only if there the No Acknowledgement Alarm flip-flop 43F (FIG. 17) is reset. Therefore, when the operator presses the request switch, input 26–8 to gate 26C (FIG. 11) becomes a 0 and the output of gate 26C follows the distributor oscillator frequency at input 26–D. The first 1 to 0 transition will set the request flip-flop. This flip-flop will remain set until the Start-Stop Tight Tape Arm or the Tape Out Pin opens up which will place a 0 signal on the reset pedestal 30–2 of flip-flop 30F.

The logic and operation of the Invitation Request flip-flop 29′F will now be described. The switching center generates the polling sequence to invite each outstation on the way circuit to send a message into the switching center. If the switching center sends out a complete polling sequence and finds no selector with a message to send it stops polling. Therefore, when any selector on this way circuit acquires a message to send into the switching center it asks for a polling sequence by transmitting a blank character to the center. The actual character is not important since the switching center is only looking for a spacing pulse.

When the switching center completes a full polling sequence in which no selector has a message to transmit it sends a FIGS. character which will set the Invitation Request flip-flop 29′F. When this flip-flop is set it allows the invitation request signal (blank) to be sent to the switching center. This operation will be described later.

Before the operation of transmitting this blank character can be described, it is necessary to describe the operation of cycling the sending distributor SD (FIG. 2) once to generate this signal and also all answer-back characters sent from the selector. In order to send single characters to the line the sending distributor must be cycled once, which is accomplished with the SD One-Cycle Control flip-flop 33F (FIG. 12) and the #1 auto-stop lead 32–A. To start the sending distributor SD a 1 signal is placed on any input to gate 32B. This places a 0 signal on both input 32–B to gate 32G and on the set pedestal 33–B of flip-flop 33F. The input 32–C to gate 32E will also be a 0 since flip-flop 33F is reset at this time. The input D to gate 32E will be a 0 when the receiving distributor RD is stopped. This last input is included to eliminate a timing problem when the selector is operated "off line" in the "local test" mode. When all inputs to gate 32E are 0 its output is a 1, causing the sending distributor SD to run. As soon as the sending distributor is started the output of gate 32D changes from 1 to 0 which sets flip-flop 33F and places a 1 signal on input 32–C to gate 32E, driving its output to the 0 state. This 0 signal on the #1 auto-stop lead 32–A will prepare the sending distributor to stop once it completes its cycle. Note this flip-flop 33F will remain set until a character is received on the receive line which will start the receiving distributor and generate a 1 to 0 transition on the reset trigger.

The transmitter portion of the ASR set is stepped once for every revolution of the sending distributor. This is accomplished via input 34–3 to gate 34B (FIG. 12) which is a pulse that is a 0 from the end of the rest to the end of the third pulse. This 0 input is normally used to drive input 34–N of gate 34C to the 1 state and thereby energize the transmitter clutch magnet. Therefore, whenever the sending distributor is cycled once to send characters to the switching center the transmitter must be prevented from stepping. This is done via input 34–2 to gate 34B, which will be a 1, whenever the sending distributor is cycled once, holding the output of gate 34B in its 0 state.

Whenever an answer-back character is to be transmitted this character must be loaded into the sending encoder SE (FIG. 14). Since the transmitter pins in the ASR set load information into the sending encoder they must be blinded off whenever an answer-back is sent. This is done by taking the reset output of the SD one-cycle control flip-flop 33F through emitter follower 50F, and applying it as an input to gates 41A–41E. Therefore, whenever flip-flop 33F is set the output of gates 41A–41E will be 0 irrespective of the information on the transmitter pins. Operation of the sending encoder SD is described in greater detail below.

We are now ready to describe the operation of sending the Invitation Request signal (blank) to the switching center. If the sending counter SC (FIG. 10) is in count #1, input 27–C to gate 27F (FIG. 12) will be 0; and if a W has not been received the W flip-flop 60′F (FIG. 7) will be reset and input 27–B to gate 27F will also be a 0. With all inputs to gate 27F in their 0 state its output will be a 1 and the sending distributor SD will be one-cycled as previously described. At this time all coding input leads of the sending distributor will be in their space or 1 condition and the character blank will be sent.

The switching center can at its discretion eliminate any T-Call character from the polling sequence. If a selector T-Call character is eliminated and this drop sends an invitation request signal (blank), the switching center will generate a polling sequence without the selector T-Call character. Therefore, the particular selector cannot send its message to the switching center and, if no other selector on the circuit has a message to send, a FIGS. character will be sent at the end of the polling sequence. This FIGS. character will set the Invitation Request flip-flop 29′F, as previously described, and the selector will again send an Invitation Request signal. It will be noticed that this process is repetitive and the switching center will be continuously polling. To eliminate this condition the center close-out flip-flops 31F and 31′F are used.

When a FIGS. character is received the FIGS. reading gate 52A (FIG. 6A) has a 1 to 0 transition on its output at the first one-third of the rest pulse. This transition is used to set flip-flop 31F. With flip-flop 31F set, a "C" is placed on the set pedestal 31–J of flip-flop 31′F. Therefore, if flip-flop 31F is set and a second FIGS. character is received, before a T-Call character, flip-flop 31′F will be set. Note that if a T-Call is received before the second FIGS. character that flip-flop 31F will be reset and, therefore, flip-flop 31′F cannot be set, since input 31–J is a 1. With flip-flop 31′F set, a 1 is applied to input 27–3 of gate 27C (FIG. 11) and the Invitation Request signal cannot be sent to the switching center. Note that when the switching center adds this particular T-Call character back into the polling sequence both flip-flops 31F and 31′F will be reset and the blank characters may be again sent.

With the counter in count #1 and the W flip-flop 60′F reset, when the T-Call character is received all inputs to gate 27E (FIG. 12) will be in the 0 state and the gate output is a 1. Note that the T-Call, input 27–11, is a 0 from the middle of the fifth pulse of the T-Call to the middle of the first pulse of the next character. As explained above, the "1" output of gate 27E will cause the sending distributor SD to cycle one character. The output 27–10 of gate 27E is also used to drive input 42–C of gate 42C (FIG. 14) of the sending encoder SE. It will be noticed that the 1 signal on input 42–C of gate 42C places a mark condition on the #3 coding input of the sending distributor, i.e., the third pulse will be marking. As explained above, whenever flip-flop 33F is set the output of gates 41A–41E are all 0. If at the same time that gate 27E becomes a 1 gate 24A (FIG. 10) also becomes a 1, input 42–12 to gate 42A and input 42–F to gate 42E will also be a 1. Under this condition the #1 and #5 coding inputs to the sending distributor SD will also be in the mark condition. It will be noted that three of the inputs to gate 24A are exactly identical to gate 27E. The input 24–N to gate 24A comes from the blank reading circuit 37D–37F. When the auxiliary A contact of the transmitter is closed and a not-blank character is stored on the transmitter pins, the output of gates 37D–37F is a 0. Since the output of gates 37D–37F is also a 0 when the auxiliary A contact is open this contact is also gated into gate 24A, i.e., we can only interrogate gates 37D–37F for a not-blank character when the auxiliary A contact is closed. If the request flip-flop 30–F is set input 24–1 to gate 24A will also be a 0. To sum up what we have said to this point, if gate 27E alone is a 1 a space is sent but if gate 24A is also a 1 a Y (1, 3 and 5 pulses marking) will be sent. Therefore, when the T-Call character is received if the request flip-flop 30F is reset or a blank character is in the transmitter, a space or "no" answer-back will be sent meaning that this selector does not have a message to send. If both the request flip-flop is set and a not-blank character is in the transmitter a Y or "Yes" answer-back is sent.

If a "Yes" answer-back is sent, with gate 24A a 1 the set pedestal 28–B of flip-flop 28F will be a 0. At the end of the fifth pulse of this character there will be a 1 to 0 transition on the set trigger of flip-flop 28F which will be set and the counter SC will be in count #2.

*Sending unit—count #2*

When the switching center receives a "Yes" answer-back it will transmit a carriage return character to the selector which will step the counter to count #3 and start message transmission to the switching center. With the counter in count #2 a 0 is placed on the set pedestal of flip-flop 28′F. Since at the first one-third of the rest pulse there is a 1 to 0 transition on the set trigger, flip-flop 28′F is set, driving the counter SC to count #3.

When the switching center transmits a T-call character it is looking for a "Yes" or "No" answer-back. If it does not receive this answer-back after a predetermined interval it will transmit a Y. When this Y is received input 23–G to gate 23D will be a 1 from the middle of the fifth pulse to the first one-third of the rest pulse. Therefore, at the first one-third of the rest pulse there will be 1 to 0 transition on input 28–5 of flip-flop 28F causing it to be reset which places the counter SC in count #1. It will be noticed that whenever the counter is not in count #1 the set pedestal of flip-flop 43F (FIG. 17) is a 0. Therefore, in general, whenever the sending counter is reset to count #1 via a 1 to 0 transition on gate 23E, then the no-acknowledgement alarm flip-flop 43F is set. With flip-flop 43F set, the no-acknowledgement alarm lamp will be lit. Note that this flip-flop must be manually reset via the no-acknowledgement alarm switch. Note too that in general any time flip-flop 43F is set that the Request flip-flop will be reset via input 30–5.

*Sending unit—count #3*

When the counter SC steps to count #3, input 21–F to one-shot multivibrator 21 (FIG. 12) becomes a 0 and timing of the one-shot multivibrator is started. After 40 milliseconds the input 32–F to gate 32F becomes 0. If the W flip-flop is reset input 32–J to gate 32F is also a 0. If the Start-Stop Tight Tape Arm and Tape-Out pin are closed, input 32–E to gate 32F is also a 0. With all these inputs a 0 the output of gate 32F is a 1 which, via the auto-stop #2 lead, causes the sending distributor to run. During each cycle of the sending distributor, input 34–3 to gate 34B is a 0 from the end of the rest pulse to the end of the third pulse. Input 34–2 to gate 34B is also a 0 at this time since flip-flop 33F is reset. Therefore, input 34–3 to gate 34B will energize the transmitter clutch magnet from the end of the rest to the end of the third pulse. This allows the transmitter to step for every cycle of the sending distributor.

The information from the pins of the transmitter is placed on the coding inputs of the sending distributor through the sending encoder SE. The operation of the #1 pulse pin of the transmitter will be described; all other pins operate in an identical manner. If the #1 transmitter pin senses a mark condition in the tape, it closes and places a 0 on input 41–2 to gate 41A. Since the SD one-cycle flip-flop 33F is reset at this time input 33–3 is also a 0. Both inputs of gate 41A being a 0, cause the gate output to be a 1. This 1 is applied to input 42–11 of gate 42A causing the #1 coding input to be in its 0 or mark condition. Note that inputs 42–12 and 42–N to gate 42A are both a 0 at this time. By the same process if the pin senses a space in the tape a 1 or space condition is placed on the #1 coding input.

It at any time during message transmission the Start-Stop Tight Tape Arm or Tape-Out Pin of the transmitter opens up, the Sending Distributor will stop since input 32–E to gate 32F (FIG. 12) will at this time be a 1. At this time the Request flip-flop 30F will also be reset since the reset pedestal 30–2 is not a 0. If the transmission stops for more than ten seconds the switching center will transmit a Y. As described above, any time the sending counter is not in count #1 and a Y is received, the counter will be reset to #1, the No-acknowledgement Alarm flip-flop will be set and the Request flip-flop 30F will be reset.

During message transmission to the switching center the center may have a message to transmit to the selector. If this is the case the selector must stop transmission to the center in order that it may send the answerback to its R-Call character. Therefore, if at any time during message transmission a pause W is received on the receive line the W flip-flop 60'F will be set. With the W flip-flop set, input 32–J to gate 32F (FIG. 12) is a 1, which will cause the Sending Distributor to stop. At the end of the receiving selection cycle, defined by a space character, the W flip-flop 60'F is reset which will again allow the Sending Distributor to run.

The End-of-Message reading circuits will now be described. The first two E.O.M. character reading gates 38A and 38C are to be patched for the first two characters of the end-of-message "FIGS. J." Flip-flop 43'F is used to eliminate the bounce from the Auxiliary Arm B contact of the transmitter. When the Auxiliary B contact is closed the set pedestal of flip-flop 43'F is a 0 and the reset pedestal is a 1. The flip-flop is triggered via gate 27A (FIG. 11) with the inversion of the distributor oscillator frequency. Therefore, when there is a 1 to 0 transition on the output of gate 27A and the Auxiliary B contact is closed flip-flop 43'F will be set. By the same analysis it can be seen that when the Auxiliary B contact opens flip-flop 43'F will be reset. Therefore, when the "FIGS." character is set up on the transmitter pins the output of gate 38A will be a 1 during the time flip-flop 43'F is set. This 1 places a 0 on the set pedestal of flip-flop 39'F. When the Auxiliary B contact opens up and flip-flop 43'F is reset flip-flop 39F will be set. With flip-flop 39F set a 0 is placed on the set pedestal of flip-flop 39'F. If the next character is a J the output 38–A of gate 38C will be a 1 during the closure time of the Auxiliary B contact. Therefore, when the Auxiliary B contact opens flip-flop 39'F will be set. With flip-flop 39'F set a 0 is applied to input 25–11 of gate 25A (FIG. 10). If the next character received is a Letters character gate 38E will be a 1 during the Auxiliary B contact closure time. The output 38–H of gate 38E causes input 25–N of gate 25A to be a 0. If the sending counter is in count #3 input 25–12 to gate 25A will also be a 0. With all inputs to this gate a 0 its output will be a 1, and when the Auxiliary B contact opens up the output of gate 25A will return to 0. This 1 to 0 transition will reset flip-flop 28F thereby placing the counter in count #4.

When the switching center receives an End-of-Message signal it transmits a Line Feed character acknowledgement. Therefore, if the selector did not read the end-of-message signal and step to count #4, this Line Feed acknowledgement would be received with the counter in count #3. When the Line Feed is received input 23–11 to gate 23B becomes a 0. During the interval from the middle of the fifth pulse to the first one-third of the rest pulse input 23–12 to gate 23B is a 0. With the counter SC in count #3 input 23–N is also a 0. Since the W flip-flop 60'F is reset at this time, gate input 23–5 is also a 0. Therefore, the output of gate 23B is a 1 from the middle of the fifth pulse to the first one-third of the rest of this Line Feed. This same pulse appears at the output 23–1 of gate 23E and will reset the counter SC to 1. Remembering as previously described that whenever the counter is reset to 1 the No-Acknowledgement Alarm flip-flop is set and the Request flip-flop is reset.

*Sending unit—count #4*

With the counter SC in count #4 the way selector is looking for the Line Feed acknowledgement of the end-of-message from the switching center. When this Line Feed is received input 24–F to gate 24F is a 0. Input 24–J to gate 24F is also a 0 since the counter is in count #4. Input 24–E to gate 24F is a probe from the Receiving Distributor, which is a 0 from the middle of the fifth pulse of the Line Feed to the middle of the first of the next character. Therefore, upon receipt of the Line Feed the output 24–H of gate 24F is a 1 from the middle of the fifth pulse to the middle of the first pulse of the next character. When gate output 24–H becomes a 1, power amplifier 35 (FIG. 12) in counter SAA is turned on and the message counter magnet is energized causing it to add 1 to its total. When the next character is received gate output 24–H becomes a 0 which will reset flip-flop 28'F and place the counter in count #1.

Note that as soon as the way selector reads an end-of-message sequence it stops transmission to the switching center. If the center does not read the end-of-message sequence it will appear to the center as if the selector's transmitter has stopped for more than ten seconds. After this time interval the switching center will transmit a Y. Receipt of this Y will reset the sending counter SC to count #1, set the Alarm flip-flop and reset the Request flip-flop.

When the sending counter steps to count #4 a ten-seconds one-shot multivibrator 22 starts its timing interval since gate 26B is now a 0. If the selector does not respond to the Line Feed acknowledgement from the center within ten seconds and reset the counter to 1, the one-shot multivibrator 22 will be reset. If the one-shot multivibrator is reset input 23–D to gate 23C will be a 0 and since the counter is in count #4, input 23–C will also be a 0. Therefore, when the next character is received input 23–B will be a 0 from the middle of the fifth to the first one-third of the rest pulse. This input will cause a 1 to 0 transition of the output of gates 23C and 23E which will reset the counter to 1. Since the counter was reset to 1 via gate 23E the No-Acknowledgement Alarm flip-flop 43F will be set and the Request flip-flop 30F will be reset as previously described.

*Basic logic circuits*

In FIGS. 19A–19D are shown four gate circuits respectively designated G1–G4. Gate circuits G1 and G2 have three inputs each and gate circuits G3, G4 have two inputs each. Each of these gate circuits is of the "NOR" gate type. A NOR gate is defined herein as one in which the output is a 1 (or at negative) if neither the first input nor second input, nor third input (in a three-input gate) is negative. Each gate circuit employs a transistor GTR1–GTR4 which is used alternatively in conducting and non-conducting condition. Gates G1 and G3 are distinguished from gates G2, G4 respectively by provision of a collector resistor GCR or GCR' in gates G1 and G3. When two gate or more circuits are to be strapped together in parallel in the system, only one collector resistor is required, thus one gate G1 or G3 will be used with one or more gates G2 or G4. The collector GCL2 or GCL4 of gate G2 or G4 will be strapped to the collector GCL1 or GCL3 of gate G1 or G3. In each of FIGS. 19A–19D the triangular symbol identifying each gate is shown and the symbol appears in the several components where gates are employed.

In FIG. 20 is shown a flip-flop circuit FF of the type employed throughout the way selector system. The rectangular symbol for the flip-flop circuit is also shown as it appears in the several circuit diagrams. The terminals of the flip-flop circuit are identified by numerals and letters and the flip-flop circuit symbol has correspondingly marked terminals.

The flip-flop circuit illustrated is used as a binary counter shift register or information storage element. The circuit includes transistors Q1F or Q2F and associated capacitors and resistors. The circuit can be in one of two distinct stable states, the set state or the reset state. The reset state exists when transistor Q1F is fully on, that is, its collector is at ground potential, with transistor Q2F fully off, its collector being at negative potential. In the set state the opposite is true, i.e., when transistor FQ2F is fully on, transistor Q1F is fully off. The terminal 6, 11 is used as a direct current (D.C.) reset terminal. Application of a negative potential at terminal 6, 11 will turn transistor Q1F on and put the flip-flop in the reset state. This reset terminal is used to reset the flip-flop after power to the flip-flop is cut off and is turned on again.

Terminal 5, 12 is an alternating current (A.C.) reset terminal. Application of a positive going pulse at this terminal will cause the circuit to go to the reset state and the pedestal resistor is always at ground. Positive going trigger pulses at terminal 3, 9 or 4, 10 will reset the flip-flop provided terminal 2, 8 is at ground. Positive going trigger pulses at terminal C, K or D, L will set the flip-flop circuit provided terminal B, J is at ground.

The two stable states of the flip-flop circuit are referred to the voltage levels at the collectors of the two transistors, respectively, to which R terminal A, H and S terminal 1, 7 are connected. These voltage levels are either negative or ground. The collector will remain at a particular voltage level until a triggering pulse occurs which will switch the circuit into the other stable state.

In one stable state transistor Q1F is on and transistor Q2F is off. Then the collector of transistor Q1F is at ground potential. Positive voltage is applied to the base of transistor Q2F. This positive voltage holds transistor Q2F off and places its collector at a negative potential. This negative potential keeps transistor Q1F on and maintains the circuit in a stable state.

In the other stable state transistor Q2F is on and transistor Q1F is off. The collector of transistor Q2F is at ground potential. Positive voltage applied to the base of transistor Q1F holds this transistor off and places its collector at negative potential. This negative potential keeps transistor Q2F on and maintains the circuit in its other stable state.

The automatic reset circuit AR, shown in FIG. 21 together with its rectangular symbol, is used to apply DC voltage to the DC reset terminal 6, 11 of one or more flip-flops FF shown in FIG. 20. Under normal operation the output of the automatic reset circuit is a ground potential and will not affect the operation of flips-flops to which it is connected. However, when power is turned on the output of the automatic reset circuit will go negative and reset all connected flip-flops. When the power supply is turned on, capacitor AR–C holds the junction of the zener diode ZD and resistor AR–R at ground potential. The transistor QAR is back biased by the zener diode and is held off until capacitor AR–C charges up to the voltage at the zener diode. The output of the circuit AR then becomes negative and the connected flip-flops are reset.

In FIG. 22 is shown the circuit of an emitter follower EF and its rectangular symbol as used in the diagrams of the components of the way selector. The emitter follower includes two resistors EF–R1 and EF–R2 and one transistor Q–EF. The output at the emitter of the transistor is connected to the load. The input signal is connected to the base of the transistor. The collector of the transistor is connected to negative potential via resistor EF–R1 and the emitter is connected to positive potential via resistor EF–R2. The emitter follower has the characteristic that the output signal follows the input signal with a current gain but no signal inversion. It has a high input impedance and presents a low output impedance to a negative going load. The emitter follower EF may be used as a driving stage between the output of a NOR gate or flip-flop and its load.

FIG. 23 is a diagram of a one-shot multivibrator circuit OS. This circuit is used in the way selector to delay a signal applied thereto for a predetermined time or to provide a pulse of predetermined time duration at its output. The circuit can be triggered by a pulse applied from an external source to terminal OS–L. The circuit is generally of a conventional type and is provided here to facilitate an understanding of the circuitry of the way selector. In the one-shot circuit, transistor OS–Q1 is connected in a unijunction timing circuit to provide relaxation oscillations. Transistors OS–Q2 and OS–Q3 are connected in a flip-flop circuit to the output of the unijunction timing circuit. When the flip-flop circuit is set, the timing circuit causes time delay from triggering by the applied pulse to resetting of the flip-flop. Transistor OS–Q4 is connected in an output isolating gate through which the pulse output is applied to the output terminal OS–1.

The rectangular symbol for this circuit as used in the diagrams of components of the way selector is shown in FIG. 23. The several terminals on the circuit symbol are identified with letter and number symbols corresponding to those on the circuit OS.

Power amplifier PA shown in FIG. 24 is a transistorized power amplifier of known type used in the way selector at various points for powering selector magnets, relays, lamps, etc. The amplifier has two stages of amplification provided by transistors 24Q1, 24Q2. The negative voltage applied at point 24–P1 will depend on the load at the output of the amplifier. The triangular symbol for the amplifier as used in the prior diagrams of components of the way selector, is indicated in FIG. 24.

Oscillator OSC shown in FIG. 25 is used to produce flat-top clock pulses in the way selector. This oscillator, which is one of a known type, has a series resonant circuit including a tapped inductor 25C1 in series with a capacitor 25C1. Terminal 25–T1 of the capacitor can be connected to any one of the taps 25–TL of the inductor for obtaining any desired oscillation frequency. The terminals 25–P1, 25–P2 of the series resonant circuit look into low impedances presented at the emitters of transistors 25Q1, 25Q2. The two transistors serve as linear amplifiers in crossed feedback control circuits to keep the resonant circuit in continuous undamped oscillations. Sine wave oscillations are produced at point 25–P3 and are converted to square pulses in the squaring circuitry, including transistors 25Q3, 25Q4, 25Q5 at the output of the oscillator OSC.

We claim:
1. In a telegraph system, in combination:
   (a) a central station;
   (b) a plurality of way stations;
   (c) a line circuit arranged for duplex operation interconnecting the central station and the way stations;
   (d) a message recorder at each way station;
   (e) a recorder control means at said recorder for blinding and unblinding said recorder to message and control signals;
   (f) a receiving distributor connected to said line circuit for receiving signals from the central station;
   (g) reading means connected to said receiving distributor for reading a sequence of way station selection characters sent from the central station;
   (h) a receiving counter capable of assuming a predetermined number of counting states;
   (i) signal transmission means at each way station connected to said line circuit for transmitting answer-back signals to the central station; and
   (j) circuit means interconnecting said receiving counter with said receiving distributor, with said reading means, and with said signal transmission means, whereby control signals are received by said receiving distributor, messages are recorded by said recorder and answer-back signals are sent by said signal transmission means, only during counting states of said receiving counter in a receiving program determined and controlled by said counter.
2. In a telegraph system, in combination:
   (a) a central station;
   (b) a plurality of way stations;
   (c) a line circuit arranged for duplex operation interconnecting the central station and the way stations;
   (d) signal receiving means at each way station con- nected to the line circuit for receiving signals from the central station;
(e) a sending distributor connected to said line circuit for sending signals to the central station;
(f) sending distributor control means connected between said receiving means and said sending distributor for interrupting message signals being sent by the sending distributor when certain control signals are received from sending station;
(g) transmitter means connected to said sending distributor to supply signals thereto for transmission to the central station;
(h) a sending counter capable of assuming a predetermined number of successive counting states; and
(i) circuit means interconnecting said sending counter with said sending distributor control means, with said sending distributor, and with said transmitter means at each way station, whereby signals are sent to said central station from the way station only during counting states of said sending counter in a sending program determined and controlled by said counter.

3. In a telegraph system, in combination:
(a) a central station;
(b) a plurality of way stations;
(c) a line circuit arranged for duplex operation interconnecting the central station and the way stations;
(d) a message recorder at each way station;
(e) recorder control means at said recorder for blinding and unblinding said recorder to message and control signals;
(f) a receiving distributor connected to said line circuit for receiving signals from the central station;
(g) reading means connected to said reading distributor for reading a sequence of way station selection signals sent from the central station;
(h) a receiving counter capable of assuming a predetermined number of counting states;
(i) a sending distributor connected to said line circuit for sending message and answer-back signals from the way station to the central station;
(j) sending distributor control means connected between said reading means and said sending distributor for passing control signals to the sending distributor;
(k) transmitter means connected to the sending distributor to supply signals thereto for transmission to the central station;
(l) a sending counter capable of assuming a predetermined number of other counting states;
(m) circuit means interconnecting said receiving counter with said receiving distributor, with said reading means, and with said sending distributor control means, so that control signals are received by said receiving distributor, the received control signals are read by said reading means, a message sent by said central station is recorded by said recorder, and answer-back signals are sent by the sending distributor only during counting states of said receiving counter in a receiving program determined and controlled by said receiving counter; and
(n) further circuit means interconnecting said sending counter with said sending distributor control means, with said sending distributor and with said transmitter means, so that message signals and other answer-back signals are sent to the central station only during the counting states of said sending counter in a sending program determined by said sending counter.

4. In a telegraph system, in combination:
(a) a central system;
(b) a plurality of way stations;
(c) a line circuit arranged for duplex operation interconnecting the central station and the way stations;
(d) a message recorder at each way station;
(e) recorder control means at said recorder for blinding and unblinding said recorder to message and control signals;
(f) a receiving distributor connected to said line circuit for receiving signals from the central station;
(g) reading means connected to said reading distributor for reading a sequence of way station selection signals sent from the central station;
(h) a receiving counter capable of assuming a predetermined number of counting states;
(i) a sending distributor connected to said line circuit for sending message and answer-back signals from the way station to the central station;
(j) sending distributor control means connected between said reading means and said sending distributor for passing control signals to the sending distributor;
(k) transmitter means connected to the sending distributor to supply signals thereto for transmission to the central station; and
(l) circuit means interconnecting said receiving counter with said receiving distributor, with said reading means, and with said sending distributor control means, so that control signals are received by said receiving distributor, the received control signals are read by said reading means, a message sent by said central station is recorded by said recorder, and answer-back signals are sent by the sending distributor only during counting states of said receiving counter in a receiving program determined and controlled by said receiving counter.

5. In a telegraph system, in combination:
(a) a central station;
(b) a plurality of way stations;
(c) a line circuit arranged for duplex operation interconnecting the central station and the way stations;
(d) a receiving distributor connected to said line circuit for receiving signals from the central station;
(e) reading means connected to said reading distributor for reading coded control signals sent from the central station;
(f) a sending distributor connected to said line circuit for sending signals to the central station;
(g) sending distributor control means connected between said reading means and said sending distributor for passing control signals read by said reading means to said sending distributor;
(h) transmitter means connected to said sending distributor to supply signals thereto for transmission to the central station;
(i) a sending counter capable of assuming a predetermined number of successive counting states; and
(j) circuit means interconnecting said sending counter with said sending distributor control means, with said sending distributor, and with said transmitter means at each way station, whereby signals are sent to said central station from the way station only during counting states of said sending counter in a sending program determined and controlled by said counter.

6. In a telegraph system, in combination:
(a) a central station;
(b) a plurality of way stations;
(c) a line circuit arranged for duplex operation interconnecting the central station and the way stations;
(d) a message recorder at each way station;
(e) recorder control means at said recorder for blinding and unblinding said recorder to message and control signals;
(f) a receiving distributor connected to said line circuit for receiving signals from the central station;
(g) reading means connected to said receiving distributor for reading a sequence of way station selection characters sent from the central station;
(h) a receiving counter capable of assuming a predetermined number of counting states;

(i) means for initiating answer-back signals in response to way station selection signals received from the central station;

(j) means for actuating said recorder control means to blind the recorder at a way station while other selection signals are sent by the central station to other way stations;

(k) a sending distributor at each way station connected between said line circuit and the answer-back signal initiating means for transmitting said answer-back signals to the central station; and (l) circuit means interconnecting said receiving counter with said receiving distributor, with said reading means, and with said sending distributor, whereby control signals are received by said receiving distributor, answer-back signals are sent by said sending distributor, and messages are recorded by the recorder at each selected way station after cessation of said selection signals, only during counting states of said receiving counter in a receiving program determined and controlled by said counter.

7. In a telegraph system, in combination:
(a) a central station;
(b) a plurality of way stations;
(c) a line circuit arranged for duplex operation interconnecting the central station and the way stations;
(d) a receiving distributor connected to said line circuit for receiving signals from the central station;
(e) reading means connected to said reading distributor for reading coded control signals sent from the central station;
(f) a sending distributor connected to said line circuit for sending signals to the central station;
(g) sending distributor control means connected between said reading means and said sending distributor for passing control signals read by said reading means to said sending distributor;
(h) transmitter means connected to said sending distributor to supply signals thereto for transmission to the central station;
(i) a sending counter capable of assuming a predetermined number of successive counting states;
(j) means responsive to way station polling signals sent by said central station to generate answer-back signals, the last named means being connected to said sending distributor; and
(k) circuit means interconnecting said sending counter with said sending distributor control means, with said sending distributor, with the means responsive to polling signals, and with said transmitter means, whereby message signals and answer-back signals are sent to the central station from the way station only during counting states of said sending counter in a sending program determined and controlled by said counter.

8. In a telegraph system, in combination:
(a) a central station;
(b) a plurality of way stations;
(c) a line circuit arranged for duplex operation interconnecting the central station and the way stations;
(d) a receiving distributor connected to said line circuit for receiving signals from the central station;
(e) reading means connected to said reading distributor for reading coded control signals sent from the central station;
(f) a sending distributor connected to said line circuit for sending signals to the central station;
(g) sending distributor control means connected between said reading means and said sending distributor for passing control signals read by said reading means to said sending distributor;
(h) transmitter ceans connected to said sending distributor to supply signals thereto for transmission to the central station;

(i) a sending counter capable of assuming a predetermined number of successive counting states;
(j) means for generating signals constituting a request for polling by said central station;
(k) means responsive to way station polling signals sent by said central station on its own initiative and in response to polling request signals to generate answer-back signals; and
(l) circuit means interconnecting the sending counter with said sending distributor control means, with said sending distributor, with the means for generating polling request signals, with the means responsive to polling signals, and with said transmitter means, whereby message signals and answer-back signals are sent to the central station from the way station only during counting states of said sending counter in a sending program determined and controlled by said counter.

9. In a telegraph system, in combination:
(a) a central station;
(b) a pluraltiy of way stations;
(c) a line circuit arranged for duplex operation interconnecting the central station and the way stations;
(d) a message recorder at each way station;
(e) recorder control means at said recorder for blinding and unblinding said recorder to message and control signals;
(f) a receiving distributor connected to said line circuit for receiving signals from the central station;
(g) reading means connected to said reading distributor for reading a sequence of way station selection signals sent from the central station;
(h) a receiving counter capable of assuming a predetermined number of counting states;
(i) a sending distributor connected to said line circuit for sending message and answer-back signals from the way station to the central station;
(j) sending distributor control means connected between said reading means and said sending distributor for passing control signals to the sending distributor;
(k) transmitter means connected to the sending distributor to supply signals thereto for transmission to the central station;
(l) a sending counter capable of assuming a predetermined number of other counting states;
(m) means for initiating answer-back signals in response to way station selection signals received from the central station, the last named means being connected to said sending distributor;
(n) means for actuating said recorder control means to blind the recorder at a way station while other selection signals are sent by the central station to other way stations;
(o) circuit means interconnecting said receiving counter wtih said receiving distributor, with said reading means, with the answer-back initiating means, with the recorder control actuating means, and with the sending distributor, whereby way station selection signals are received by the receiving distributor, answer-back signals are sent by the sending distributor, and message signals are recorded by the recorder at each selected way station after cessation of said selection signals, only during counting states determined and controlled by said receiving counter; and
(p) further circuit means interconnecting said sending counter with said sending distributor control means, with said sending distributor and with said transmitter means, so that message signals and other answer-back signals are sent to the central station only during the counting states of said sending counter in a sending program determined by said sending counter.

10. In a telegraph system, in combination:

(a) a central station;
(b) a plurality of way stations;
(c) a line circuit arranged for duplex operation interconnecting the central station and the way stations;
(d) a message recorder at each way station;
(e) recorder control means at said recorder for blinding and unblinding said recorder to message and control signals;
(f) a receiving distributor connected to said line circuit for receiving signals from the central station;
(g) reading means connected to said reading distributor for reading a sequence of way station selection signals sent from the central station;
(h) a receiving counter capable of assuming a predetermined number of counting states;
(i) a sending distributor connected to said line circuit for sending message and answer-back signals from the way station to the central station;
(j) sending distributor control means connected between said reading means and said sending distributor for passing control signals to the sending distributor;
(k) transmitter means connected to the sending distributor to supply signals thereto for transmission to the central station;
(l) a sending counter capable of assuming a predetermined number of other counting states;
(m) means for initiating answer-back signals in response to way station selection signals received from the central station, the last named means being connected to said sending distributor;
(n) means for actuating said recorder control means to blind the recorder at a way station while other selection signals are sent by the central station to other way stations;
(o) circuit means interconnecting said receiving counter with said receiving distributor, with said reading means, with the answer-back initiating means, with the recorder control actuating means, and with the sending distributor, whereby way station selection signals are received by the receiving distributor, answer-back signals are sent by the sending distributor, and message signals are recorded by the recorder at each selected way station after cessation of said selection signals, only during counting states determined and controlled by said receiving counter;
(p) means for generating signals constituting a request for polling by said central station;
(q) means responsive to way station polling signals sent by said central station on its own initiative and in response to polling request signals, to generate other answer-back signals; and
(r) further circuit means interconnecting the sending counter with said sending distributor control means, with said sending distributor, with the means for generating polling request signals, with the means responsive to polling signals, and with said transmitter means, whereby message signals and other answer-back signals are sent to the central station from the way station only during counting states of said sending counter in a sending program determined and controlled by said sending counter.

11. In a telegraph system, in combination:
(a) a central station;
(b) a plurality of way stations;
(c) a line circuit arranged for duplex operation interconnecting the central station and the way stations;
(d) a message recorder at each way station;
(e) recorder control means at said recorder for blinding and unblinding said recorder to message and control signals;
(f) a receiving distributor connected to said line circuit for receiving signals from the central station;
(g) reading means connected to said reading distributor for reading a sequence of way station selection signals sent from the central station;
(h) a receiving counter capable of assuming a predetermined number of counting states;
(i) a sending distributor connected to said line circuit for sending message and answer-back signals from the way station to the central station;
(j) sending distributor control means connected between said reading means and said sending distributor for passing control signals to the sending distributor;
(k) transmitter means connected to the sending distributor to supply signals thereto for transmission to the central station;
(l) a sending counter capable of assuming a predetermined number of other counting states;
(m) circuit means interconnecting said receiving counter with said receiving distributor, with said reading means, and with said sending distributor control means, so that control signals are received by said receiving distributor, the received control signals are read by said reading means, a message sent by said central station is recorded by said recorder, and answer-back signals are sent by the sending distributor only during counting states of said receiving counter in a receiving program determined and controlled by said receiving counter;
(n) means for generating signals constituting a request for polling by said central station;
(o) means responsive to way station polling signals sent by said central station on its own initiative and in response to polling request signals, to generate other answer-back signals; and
(p) further circuit means interconnecting the sending counter with said sending distributor control means, with said sending distributor, with the means for generating polling request signals, with the means responsive to polling signals, and with said transmitter means, whereby message signals and other answer-back signals are sent to the central station from the way station only during counting states of said sending counter in a sending program determined and controlled by said sending counter.

12. A duplex way station selector for a way station having a message recording means and message transmitting means, comprising:
(a) a receiving distributor for receiving signals from a central station;
(b) reading means connected to said reading distributor for reading a sequence of way station selection signals received by said receiving distributor;
(c) a receiving counter capable of assuming a predetermined number of counting states;
(d) a sending distributor for sending message and answer-back signals to the central station;
(e) sending distributor control means connected between said reading means and said sending distributor for passing control signals to the sending distributor;
(f) a sending counter capable of assuming a predetermined number of other counting states;
(g) circuit means interconnecting said receiving counter with said receiving distributor, with said reading means, and with said sending distributor control means, so that control signals are received by the receiving distributor, the received control signals are read by the reading means, answer-back signals are sent by the sending distributor, and message signals are received by the receiving distributor for recording by said recording means, only during counting states of said receiving counter in a receiving program determined and controlled by said receiving counter; and
(h) further circuit means interconnecting said sending counter with said sending distributor control means and with said sending distributor so that message signals and other answer-back signals are sent by the sending distributor only during the counting states of said sending counter in a sending program determined by said sending counter.

13. A duplex way station selector for a way station having a message recording means and message transmitting means, comprising:
  (a) a receiving distributor for receiving signals from a central section;
  (b) reading means connected to said reading distributor for reading a sequence of way station selection signals received by said receiving distributor;
  (c) a receiving counter capable of assuming a predetermined number of counting states;
  (d) a sending distributor for sending message and answer-back signals to the central station;
  (e) sending distributor control means connected between said reading means and said sending distributor for passing control signals to the sending distributor;
  (f) a sending counter capable of assuming a predetermined number of other counting states;
  (g) means for initiating answer-back signals in response to way station selection signals received by said receiving distributor;
  (h) circuit means interconnecting said receiving counter with said receiving distributor, with said reading means, with the answer-back initiating means, and with the sending distributor, whereby way station selection signals are received by the receiving distributor, answer-back signals responsive to said way station selection signals are sent by the sending distributor, and message signals are received by said receiving distributor after cessation of said selection signals, only during counting states determined and controlled by said receiving counter; and
  (i) further circuit means interconnecting said sending counter with said sending distributor control means and with said sending distributor so that message signals and other answer-back signals are sent by the sending distributor only during the counting states of said sending counter in a sending program determined by said sending counter.

14. A duplex way station selector for a way station having a message recording means and message transmitting means, comprising:
  (a) a receiving distributor for receiving signals from a central station;
  (b) reading means connected to said reading distributor for reading a sequence of way station selection signals received by said receiving distributor;
  (c) a receiving counter capable of assuming a predetermined number of counting states;
  (d) a sending distributor for sending message and answer-back signals to the central station;
  (e) sending distributor control means connected between said reading means and said sending distributor for passing control signals to the sending distributor;
  (f) a sending counter capable of assuming a predetermined number of other counting states;
  (g) means for initiating answer-back signals in response to way station selection signals received by said receiving distributor;
  (h) circuit means interconnecting said receiving counter with said receiving distributor, with said reading means, with the answer-back initiating means, and with the sending distributor, whereby way station selection signals are received by the receiving distributor, answer-back signals responsive to said way station selection signals are sent by the sending distributor, and message signals are received by said receiving distributor after cessation of said selection signals, only during counting states determined and controlled by said receiving counter;
  (i) means for generating signals constituting a request for polling by said central station;
  (j) means responsive to way station polling signals sent by said central station on its own initiative and in response to polling request signals, to generate other answer-back signals; and
  (k) further circuit means interconnecting the sending counter with said sending distributor control means, with said sending distributor, with the means for generating polling request signals, and with the means responsive to polling signals, whereby message signals and other answer-back signals are sent by the sending distributor only during counting states of said sending counter in a sending program determined and controlled by said sending counter.

15. A duplex way station selector for a way station having a message recording means and message transmitting means, comprising:
  (a) a receiving distributor for receiving signals from a central station;
  (b) reading means connected to said reading distributor for reading a sequence of way station selection signals received by said receiving distributor;
  (c) a sending distributor for sending message and answer-back signals to the central station;
  (d) sending distributor control means connected between said reading means and said sending distributor for passing control signals to the sending distributor;
  (e) a sending counter capable of assuming a predetermined number of other counting states;
  (f) means for generating signals constituting a request for polling by said central station;
  (g) means responsive to way station polling signals received by said receiving distributor; and
  (h) circuit means interconnecting the sending counter with said sending distributor control means, with said sending distributor, with the means for generating polling request signals, and with the means responsive to polling signals, whereby message signals and other answer-back signals are sent by the sending distributor only during counting states of said sending counter in a sending program determined and controlled by said sending counter.

No references cited.

THOMAS A. ROBINSON, *Primary Examiner.*